(12) United States Patent
Benedict et al.

(10) Patent No.: US 11,938,768 B2
(45) Date of Patent: Mar. 26, 2024

(54) AMPHIBIOUS VEHICLES COMPRISING CYCLOIDAL PROPELLERS

(71) Applicants: The Texas A&M University System, College Station, TX (US); The Regents of the University of Michigan, Ann Arbor, MI (US)

(72) Inventors: Moble Benedict, College Station, TX (US); Sean M. McHugh, San Jose, CA (US); Chase B. Wiley, Keller, TX (US); Ramsay A. Ramsey, College Station, TX (US); Adam Kellen, San Antonio, TX (US); Yin Lu Young, Ann Arbor, MI (US)

(73) Assignees: The Texas A&M University System, College Station, TX (US); The Regents of the University of Michigan, Ann Arbor, MI (US)

( * ) Notice: Subject to any disclaimer, the term of this patent is extended or adjusted under 35 U.S.C. 154(b) by 147 days.

(21) Appl. No.: 17/321,048

(22) Filed: May 14, 2021

(65) Prior Publication Data
US 2022/0009300 A1   Jan. 13, 2022

Related U.S. Application Data

(60) Provisional application No. 63/025,427, filed on May 15, 2020.

(51) Int. Cl.
| | |
|---|---|
| *B60F 3/00* | (2006.01) |
| *B63H 1/06* | (2006.01) |
| *B63H 3/00* | (2006.01) |
| *B63H 21/17* | (2006.01) |
| *B63H 25/42* | (2006.01) |

(52) U.S. Cl.
CPC ............. *B60F 3/0007* (2013.01); *B63H 1/06* (2013.01); *B63H 3/00* (2013.01); *B63H 21/17* (2013.01); *B63H 25/42* (2013.01)

(58) Field of Classification Search
CPC ...... B63H 1/02; B63H 1/04; B63H 2001/045; B63H 1/06; B63H 1/08; B63H 1/10; B63H 3/00; B63H 21/17; B63H 25/42; B60F 3/0007
See application file for complete search history.

(56) References Cited

U.S. PATENT DOCUMENTS

| | | | | |
|---|---|---|---|---|
| 3,371,635 A | * | 3/1968 | Seeley | ..................... B63G 8/00 |
| | | | | 114/330 |
| 4,419,085 A | * | 12/1983 | Laucks | ................... B60B 19/06 |
| | | | | 440/93 |
| 2004/0048528 A1 | * | 3/2004 | Gieseke | ................... B63H 5/02 |
| | | | | 440/93 |

FOREIGN PATENT DOCUMENTS

CN   110682752 A   *   1/2020

* cited by examiner

*Primary Examiner* — Andrew Polay
(74) *Attorney, Agent, or Firm* — Conley Rose, P.C.

(57) ABSTRACT

An amphibious vehicle for traversing land and bodies of water includes a chassis, and a cycloidal propeller coupled to the chassis and which includes a plurality of cycloidal propeller blades rotatably coupled to the chassis and each extending parallel a rotational axis of the cycloidal propeller, and an extension/retraction system configured to extend the plurality of cycloidal propeller blades away from the chassis and to retract the plurality of cycloidal propeller blades towards the chassis.

16 Claims, 14 Drawing Sheets

AMPHIBIOUS VEHICLES COMPRISING CYCLOIDAL PROPELLERS

CROSS-REFERENCE TO RELATED APPLICATIONS

This application claims benefit of U.S. provisional patent application Ser. No. 63/025,427 filed May 15, 2020, and entitled "Cycloidal Propeller Underwater/Ground Vehicle," which is hereby incorporated herein by reference in its entirety for all purposes.

STATEMENT REGARDING FEDERALLY SPONSORED RESEARCH OR DEVELOPMENT

This invention was made with government support under N00014-18-1-2296 awarded by the Office of Naval Research (ONR). The government has certain rights in the invention.

BACKGROUND

In conventional vehicles or mobility platforms, locomotion is typically limited to one media such as one of land, water, and air. However, some vehicles possess the ability to traverse multiple medias. Particularly, amphibious vehicles which may transition between a first or land operational mode in which the amphibious vehicle may travel across dry land, and a second or water operational mode in which the amphibious vehicle may travel through water. Amphibious vehicles may comprise land propulsion system for conveying the amphibious vehicle across land and a separate water propulsion system for propelling the amphibious vehicle through water.

BRIEF SUMMARY OF THE DISCLOSURE

An embodiment of an amphibious vehicle for traversing land and bodies of water comprises a chassis, and a cycloidal propeller coupled to the chassis, wherein the cycloidal propeller comprises a plurality of cycloidal propeller blades rotatably coupled to the chassis and each extending parallel a rotational axis of the cycloidal propeller, and an extension/retraction system configured to extend the plurality of cycloidal propeller blades away from the chassis and to retract the plurality of cycloidal propeller blades towards the chassis. In some embodiments, the cycloidal propeller comprises a hub rotatably coupled to the plurality of cycloidal propeller blades and which houses a drive motor configured to rotate the plurality of cycloidal propeller blades about the rotational axis, and the extension/retraction system comprises a linear actuator configured to displace the hub along a longitudinal axis. In some embodiments, the cycloidal propeller comprises a wheel rotatably coupled to the chassis and a drive motor configured to transmit rotational torque to the wheel when the amphibious vehicle is in a land operational mode and to transmit rotational torque to the plurality of cycloidal propeller blades when the amphibious vehicle is in a water operational mode. In certain embodiments, the extension/retraction system is configured to retract the plurality of cycloidal propeller blades into a cavity formed within the wheel when the amphibious vehicle is in the land operational mode and to project the plurality of cycloidal propeller blades from the cavity when the amphibious vehicle is in the water operational mode. In certain embodiments, the cycloidal propeller comprises a rotor configured to rotate in unison with the plurality of cycloidal propeller blades about the rotational axis, and wherein the rotor comprises a first clutch plate, the cycloidal propeller comprises a rim coupled to the wheel and comprising a second clutch plate, and the extension/retraction system is configured to displace the first clutch plate relative to the second clutch plate such that the first clutch plate enters into interlocking engagement with the second clutch plate. In certain embodiments, the cycloidal propeller comprises a blade pitching system configured to rotate each of the cycloidal propeller blades about a longitudinal axis of the cycloidal propeller blade, and wherein the blade pitching system is configured to alter a radial direction of a thrust vector produced by the cycloidal propeller and extending orthogonally from the rotational axis. In some embodiments, the cycloidal propeller comprises a plurality of pitching actuators coupled to the plurality of cycloidal propeller blades, and wherein each of the plurality of pitching actuators is configured to rotate one of the cycloidal propeller blades about a longitudinal axis of the cycloidal propeller blades, and wherein the amphibious vehicle comprises a control system configured to individually control the actuation of the plurality of pitching actuators.

An embodiment of an amphibious vehicle for traversing land and bodies of water comprises a chassis, and a cycloidal propeller coupled to the chassis, wherein the cycloidal propeller comprises a wheel rotatably coupled to the chassis, a plurality of cycloidal propeller blades rotatably coupled to the chassis and each extending parallel a rotational axis of the cycloidal propeller, and a drive motor configured to transmit rotational torque to the wheel when the amphibious vehicle is in a land operational mode and to transmit rotational torque to the plurality of cycloidal propeller blades when the amphibious vehicle is in a water operational mode. In some embodiments, the cycloidal propeller comprises a rotor configured to rotate in unison with the plurality of cycloidal propeller blades about the rotational axis, and wherein the rotor comprises a first clutch plate, the cycloidal propeller comprises a rim coupled to the wheel and comprising a second clutch plate, and the extension/retraction system is configured to displace the first clutch plate relative to the second clutch plate such that the first clutch plate enters into interlocking engagement with the second clutch plate. In some embodiments, the amphibious vehicle further comprises a steering actuator configured to rotate a central axis of the cycloidal propeller relative to the chassis. In certain embodiments, the amphibious vehicle comprises an amphibious propulsion system comprising a plurality of the cycloidal propellers configured to control an attitude of the amphibious vehicle when the amphibious vehicle is in both a land operational mode and a water operational mode, and wherein the amphibious vehicle comprises a water propulsion system configured to provide a thrust to the amphibious vehicle when the amphibious vehicle is in the water operational mode. In certain embodiments, the cycloidal propeller comprises a blade pitching system configured to rotate each of the cycloidal propeller blades about a longitudinal axis of the cycloidal propeller blade, and wherein the blade pitching system is configured to alter a radial direction of a thrust vector produced by the cycloidal propeller and extending orthogonally from the rotational axis. In some embodiments, the blade pitching system comprises a servo coupled to a linkage system, and wherein the linkage system is coupled to a blade shaft of each of the plurality of cycloidal propeller blades. In some embodiments, the cycloidal propeller comprises a plurality of pitching actuators coupled to the plurality of cycloidal propeller blades, and wherein each of the plurality of pitching actuators is configured to rotate one of the cycloidal propeller blades about a longitudinal axis of the cycloidal propeller blades, and wherein the amphibious vehicle comprises a control system configured to individually control the actuation of the plurality of pitching actuators.

An embodiment of an underwater vehicle comprises a chassis, a plurality of cycloidal propellers coupled to the chassis, wherein each of the cycloidal propellers comprises a plurality of cycloidal propeller blades rotatably coupled to the chassis and each extending parallel a rotational axis of the cycloidal propeller, and a blade pitching system configured to rotate each of the cycloidal propeller blades about a longitudinal axis of the cycloidal propeller blade, and wherein the blade pitching system is configured to alter a radial direction of a thrust vector produced by the cycloidal propeller and extending orthogonally from the rotational axis. In some embodiments, the blade pitching system comprises a plurality of pitching actuators coupled to the plurality of cycloidal propeller blades, and wherein each of the plurality of pitching actuators is configured to rotate one of the cycloidal propeller blades about a longitudinal axis of the cycloidal propeller blades, and the vehicle comprises a control system configured to individually control the actuation of the plurality of pitching actuators. In some embodiments, each pitching actuator comprises a sensor configured to monitor a force applied to the cycloidal propeller blade by the surrounding environment. In certain embodiments, the sensor is configured to determine a pitch angle of the cycloidal propeller blade about an azimuth of the cycloidal propeller, and the control system is configured to individually control the actuation of each of the plurality of pitching actuators based on at least one of the force applied the cycloidal propeller blade and the pitch angle of the cycloidal propeller blade. In certain embodiments, the chassis comprises one or more control surfaces positioned on an exterior of the chassis to stabilize the vehicle during operation. In some embodiments, the cycloidal propeller comprises an extension/retraction system configured to extend the plurality of cycloidal propeller blades away from the chassis and to retract the plurality of cycloidal propeller blades towards the chassis. In some embodiments, the cycloidal propeller comprises a wheel rotatably coupled to the chassis and a drive motor configured to transmit rotational torque to the wheel when the amphibious vehicle is in a land operational mode and to transmit rotational torque to the plurality of cycloidal propeller blades when the amphibious vehicle is in a water operational mode. In certain embodiments, the extension/retraction system is configured to retract the plurality of cycloidal propeller blades into a cavity formed within the wheel when the amphibious vehicle is in the land operational mode and to project the plurality of cycloidal propeller blades from the cavity when the amphibious vehicle is in the water operational mode.

BRIEF DESCRIPTION OF THE DRAWINGS

For a detailed description of exemplary embodiments of the disclosure, reference will now be made to the accompanying drawings in which.

DETAILED DESCRIPTION OF THE DISCLOSED EMBODIMENTS

Figure 1:
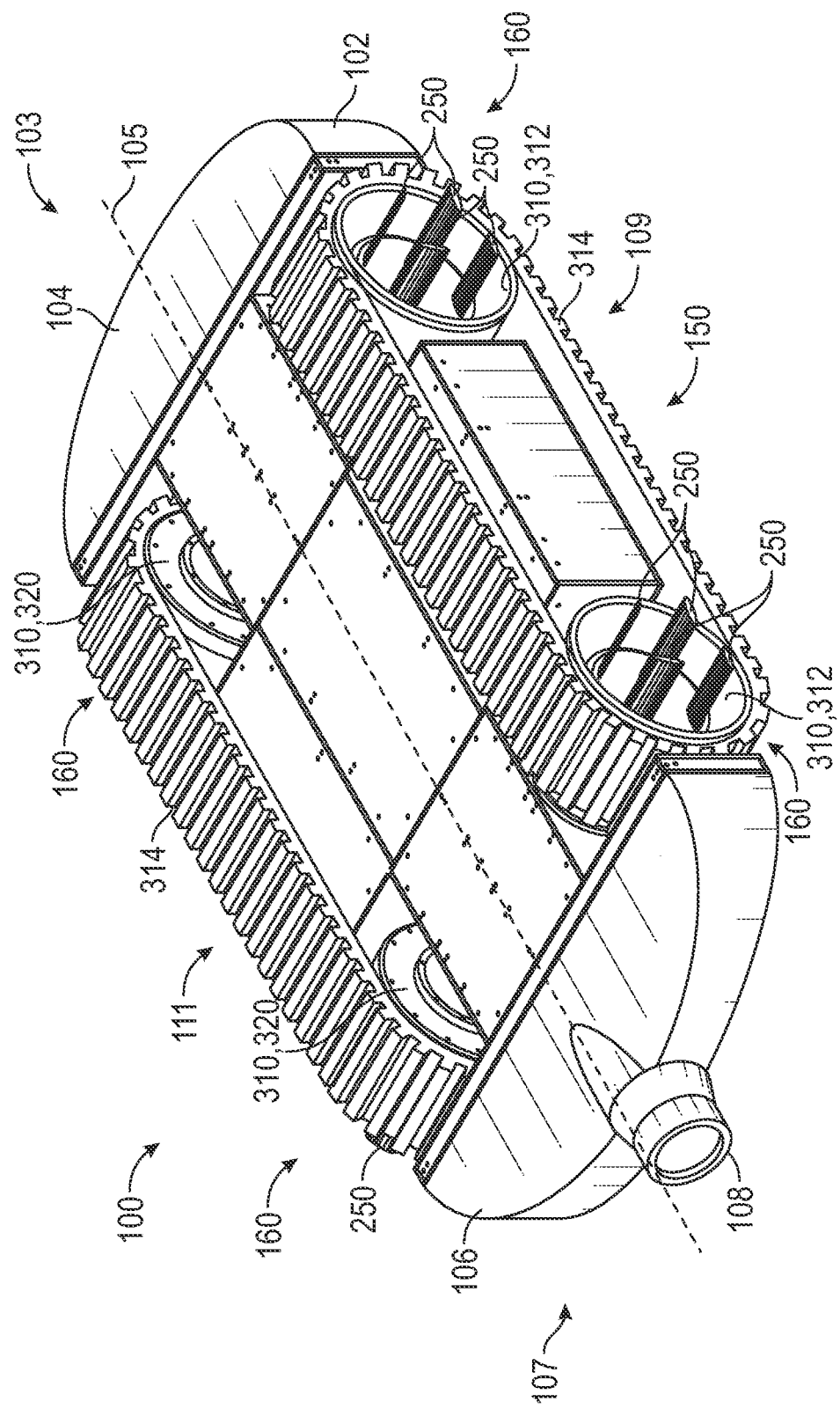
FIG. 1 is a perspective view of an embodiment of an amphibious vehicle for traversing land and bodies of water.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

As described above, amphibious vehicles are vehicles capable of transitioning between a land operational mode in which the amphibious vehicle may traverse dry land and a water operational mode in which the amphibious may travel through water. Conventional amphibious vehicles typically comprise separate propulsion systems corresponding to their different modes of operation. In other words, a conventional amphibious vehicle may comprise a land propulsion system such as powered wheels or tracks for conveying the vehicle across land, and a separate water propulsion system such as an axially driven propeller for propelling the amphibious vehicle through water. The water propulsion system of conventional amphibious vehicles may be inoperable when the vehicle is in the land operational mode, while the land propulsion system may be inoperable when the amphibious vehicle is in the water operational mode.

The requirement of separate propulsion systems may undesirably increase the size and weight of the conventional amphibious vehicle. Additionally, the requirement of separate propulsion systems may decrease the range and reliability of the conventional amphibious vehicle given the added complexity inherent with dual propulsion systems. Further, conventional amphibious vehicles typically may only travel along the surface of the water and may not beneath the surface with six degrees of freedom, limiting the mobility of the conventional amphibious vehicle.

Embodiments of vehicles, including amphibious vehicles, described herein address the limitations noted above with respect to conventional amphibious vehicles by providing an amphibious vehicle with a single amphibious propulsion system which may be operated in both a land operational mode and a water operational mode. Additionally, the amphibious vehicles disclosed herein may be symmetric about a horizontal mid-plane of the vehicle so that the vehicle may be operated upside on land without hindering performance of the amphibious vehicle.

In some embodiments, the amphibious propulsion system may both control the direction of the amphibious vehicle and provide the entirety of the thrust for the amphibious vehicle in both the land and water modes of operation. In other embodiments, one or more additional or supplemental propulsion systems may be utilized to provide supplementary thrust in one of the modes of operation while the amphibious propulsion system controls the direction of the amphibious vehicle in each operational mode. The one or more supplemental propulsion systems may be simplified given that it is not responsible for controlling the direction of the amphibious vehicle. Thus, by providing an amphibious vehicle with only a single amphibious propulsion system or an amphibious propulsion system with a simplified supplemental propulsion system, the size and weight of the amphibious vehicle may be minimized, thereby minimizing the cost associated with producing the amphibious vehicle and maximizing the vehicle's performance such as, for example, the stealthiness of the amphibious vehicle and the vehicle's range and agility. The amphibious vehicles described herein may be utilized in a variety of applications including, for example, transporting payloads from ships to land-based destinations and vice-a-versa, surveillance, and/or reconnaissance missions.

Embodiments of the amphibious propulsion system described herein comprise wheeled cycloidal propeller systems which utilize thrust vectoring provided by a cycloidal propeller to control the direction of the amphibious vehicle when in the water operational mode and steering and/or variable revolutions per minute (RPM) of the wheeled cycloidal propeller systems to control the direction of the amphibious vehicle when in the land operational mode. In some embodiments, the wheels of the wheeled cycloidal propeller systems may be disengaged when in the water operational mode such that thrust is only applied to the cycloidal propellers. Conversely, power may be provided to the cycloidal propellers when in the land operational mode to allow the amphibious vehicle to travel across land.

Figure 2:
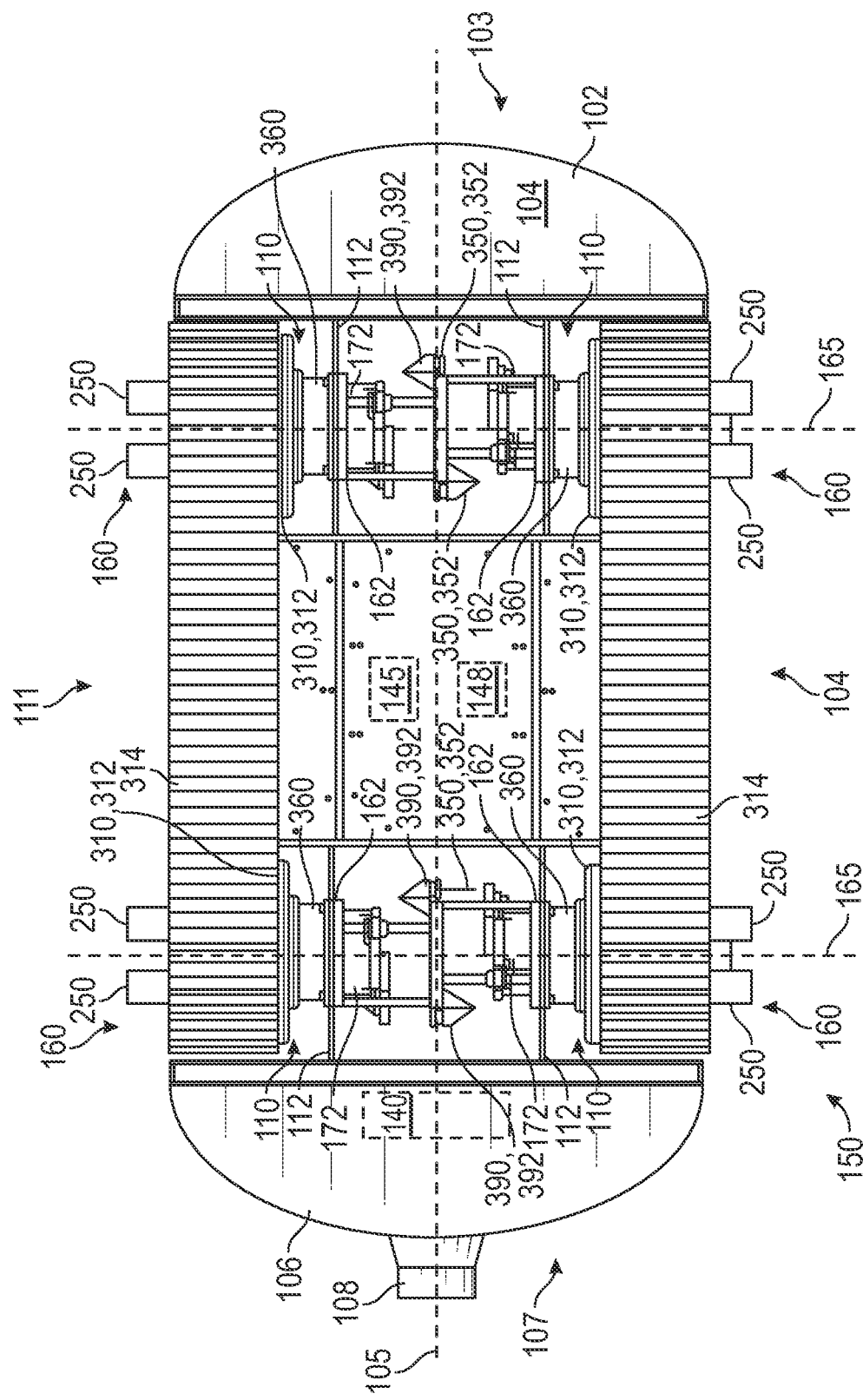
FIG. 2 is a top view of the amphibious vehicle of FIG. 1.
Figure 3:
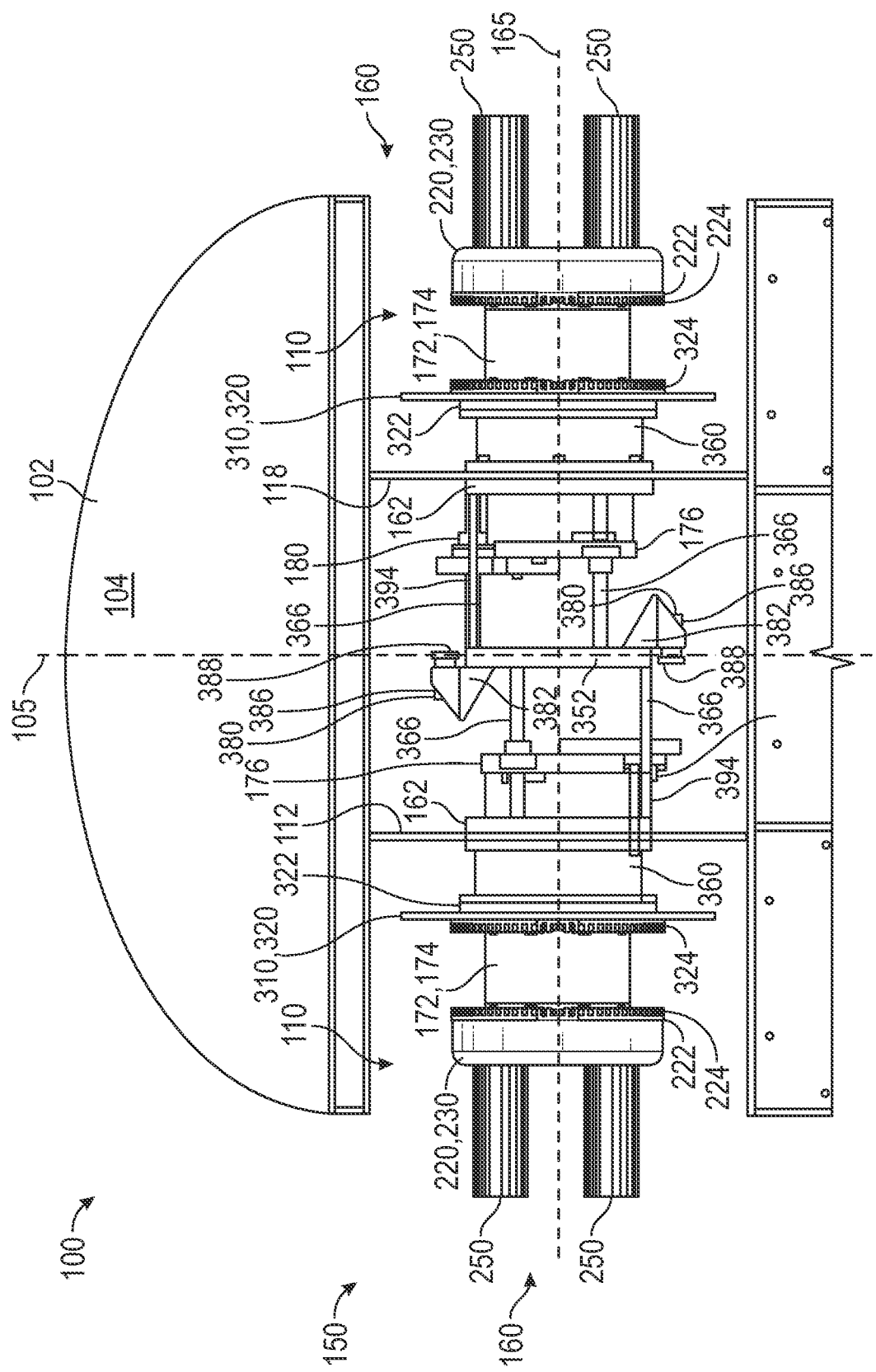
FIG. 3 is a zoomed-in top view of the amphibious vehicle of FIG. 1.

Referring to FIGS. 1-3, an embodiment of a vehicle 100 comprising an amphibious propulsion system 200 is shown. Vehicle 100 comprises an amphibious vehicle for traversing land and bodies of water and thus may also be referred to herein as amphibious vehicle 100. However, in other embodiments, vehicle 100 may not necessarily comprise an amphibious vehicle. For example, in some embodiments, vehicle 100 may comprise submersible, underwater vehicle for travelling underwater and which may or may not be configured to travel across land.

In this exemplary embodiment, amphibious vehicle 100 generally includes a body or chassis 102, a water propulsion system 140, a control system 145, a power supply 148, and an amphibious propulsion system 150 comprising a plurality of wheeled cycloidal propellers 160 coupled to and supported by the chassis 102. Amphibious vehicle 100 extends along a central or longitudinal axis 105 between a first longitudinal end or front 103 and a second longitudinal end or rear 107 of the amphibious vehicle 100. Additionally, central axis 105 extends between a pair of lateral sides 109, 111 of the amphibious vehicle 100.

Chassis 102 of amphibious vehicle 100 provides structural support to the propulsion systems 140, 150 and control system 145, power supply 148, and may comprise various materials including, for example, metal alloys, polymers, composites, etc. In this exemplary embodiment, chassis 102 comprises a first or front compartment 104, and a second or rear compartment 106. Water propulsion system 140 of amphibious vehicle is received within rear compartment 106 (shown schematically in FIG. 2) of chassis 102. In this exemplary embodiment, water propulsion system 140 comprises a pump-jet configured to emit a jet of water through a nozzle 108 extending from the rear compartment 106 at the rear 107 of amphibious vehicle 100. Thus, water propulsion system 140 may also be referred to herein as pump-jet 140. Water propulsion system 140 may thus provide an axial-directed thrust to amphibious vehicle 100 in a direction extending along central axis 105. As will be discussed further herein, water propulsion system 140 may allow amphibious vehicle 100 cruise at relatively high speeds with relatively low power consumption under water when in a water operational mode. However, while water propulsion system 140 may provide an axial-directed thrust, amphibious propulsion system 150 may still control the direction of amphibious vehicle 100 when in the water operational mode. Additionally, in this exemplary embodiment, amphibious vehicle 100 is symmetric about a horizontal mid-plane of the vehicle 100 so that the vehicle 100 may be operated upside on land without hindering performance of the amphibious vehicle 100.

Figure 4:
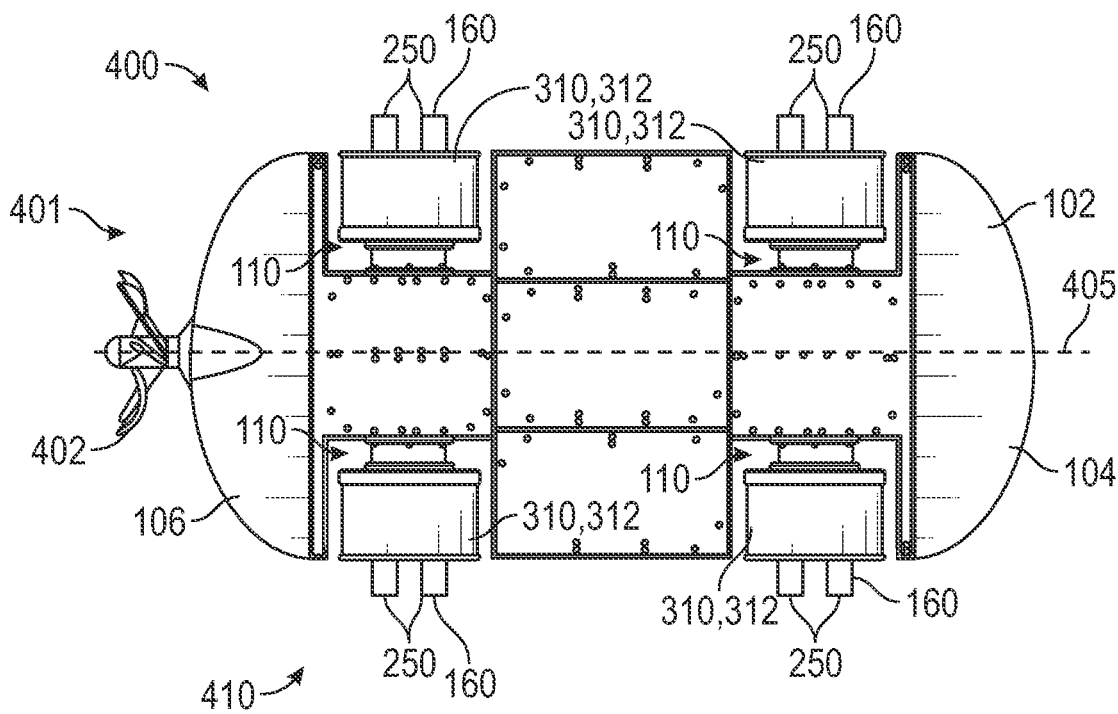
FIGS. 4, 5 are top views of other embodiments of amphibious vehicles.

In other embodiments, amphibious vehicle 100 may include water propulsion systems which differ in configuration from water propulsion system 140. For example, referring briefly to FIG. 4, another embodiment of an amphibious vehicle 400 is shown. Amphibious vehicle 400 includes features in common with amphibious vehicle 100 shown in FIGS. 1-3, and shared features are labeled similarly. Particularly, amphibious vehicle 400 includes a water propulsion system 402 positioned at a rear 401 of amphibious vehicle 400, and an amphibious propulsion system 410 also comprising a plurality of the wheeled cycloidal propellers 160 coupled to and supported by the chassis 102 of amphibious vehicle 400.

Unlike the water propulsion system 140 of amphibious vehicle 100, water propulsion system 402 of amphibious vehicle 400 comprises a screw propeller 404 which rotates about a central or longitudinal axis 405 of amphibious vehicle 400. In this manner, screw propeller 404 may similarly provide an axial-directed thrust to amphibious vehicle 400 in a direction extending along central axis 405. The axial-directed thrust provided by screw propeller 404 may similarly provide for a relatively high-speed cruise of amphibious vehicle 400 when operating underwater in a water operational mode. In some embodiments, an amphibious vehicle comprising an amphibious propulsion system may comprise a plurality of supplemental, water propulsion systems such as, for example, both a pump-jet and a screw propeller.

Figure 5:
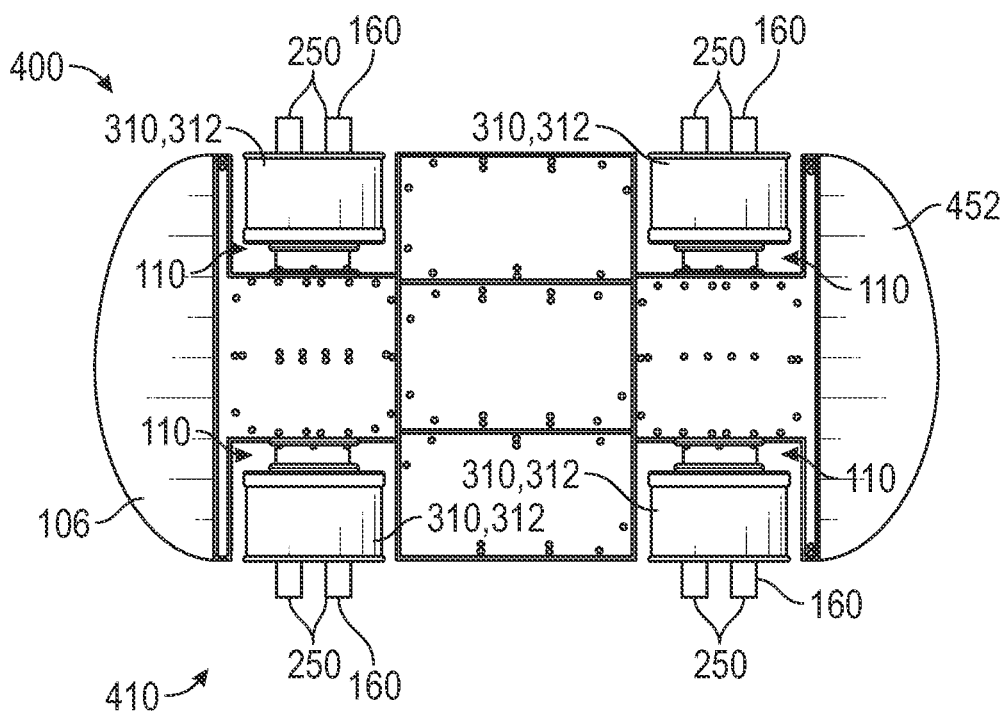

In still other embodiments, an amphibious vehicle may only include an amphibious propulsion system and not a water propulsion system. For instance, referring briefly to FIG. 5, another embodiment of an amphibious vehicle 450 is shown. Amphibious vehicle 450 is similar to amphibious vehicle 400 shown in FIG. 4 except that a body 452 of amphibious vehicle 450 does not include a water propulsion system. Instead, thrust is provided to amphibious vehicle 450 by the amphibious propulsion system 410 via wheeled cycloidal propellers 160.

Figure 6:
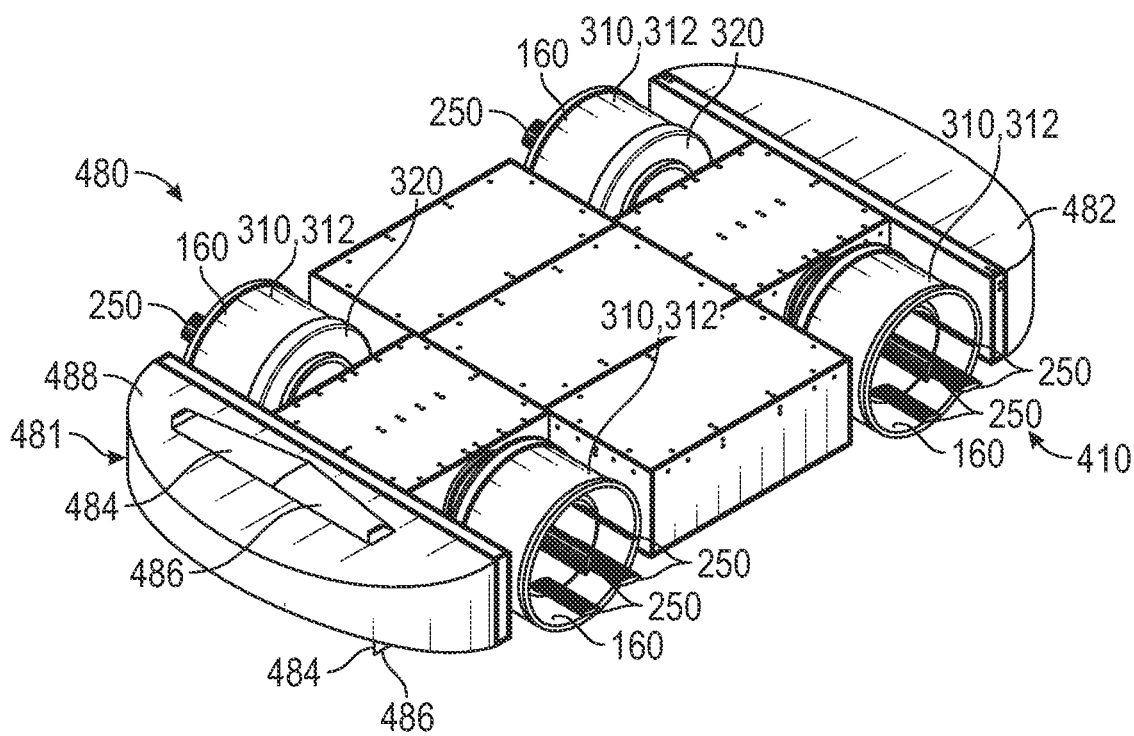
FIGS. 6, 7 are perspective views of another embodiment of an amphibious vehicle.
Figure 7:
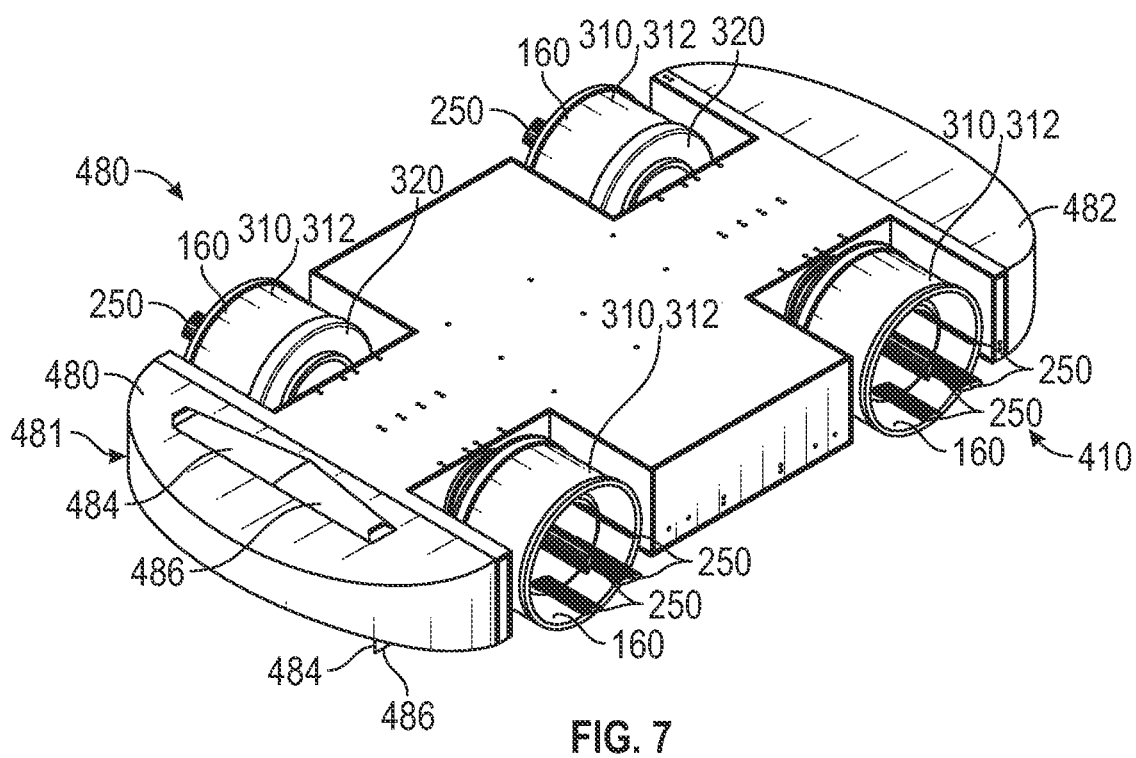
Figure 8:
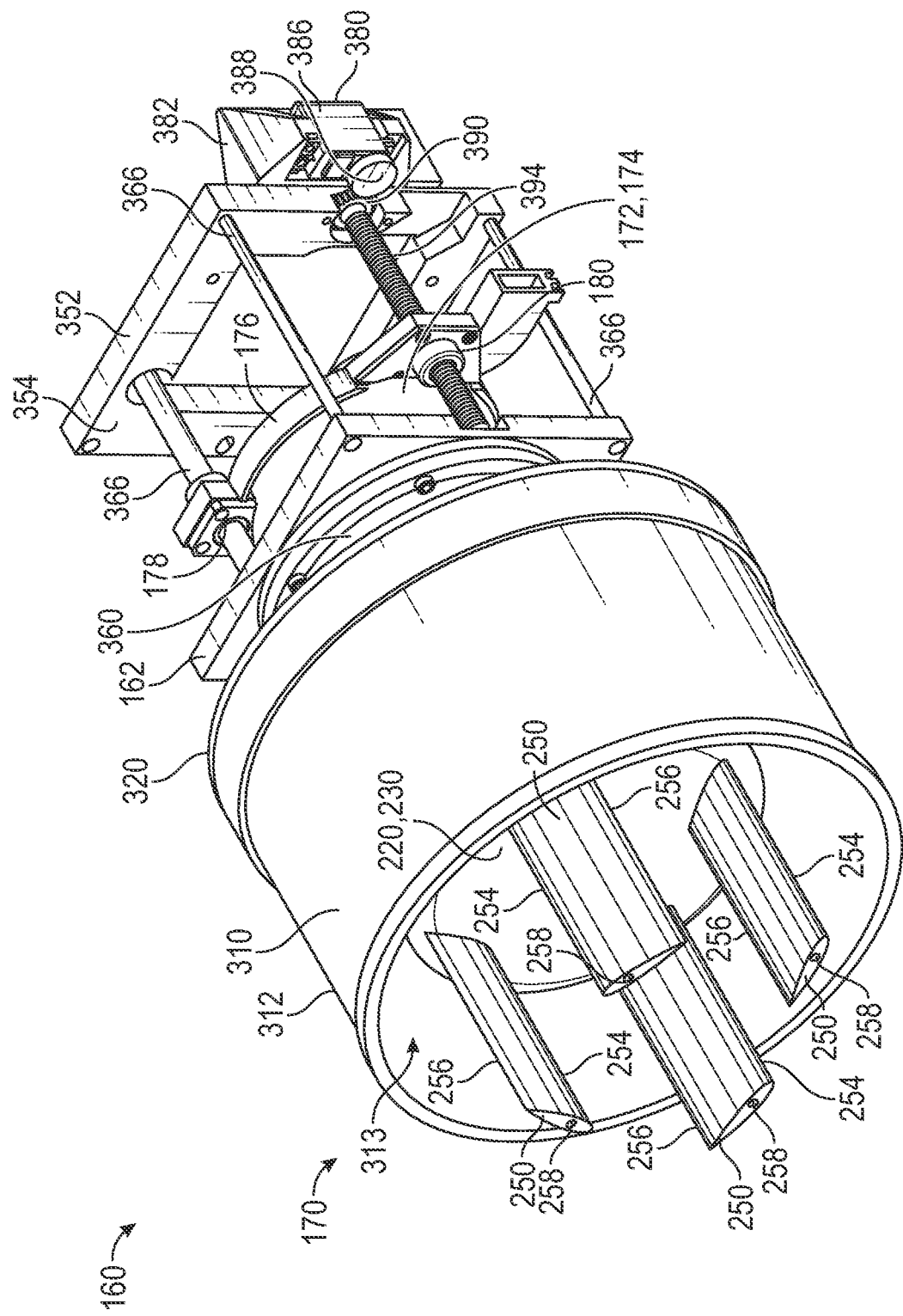
FIGS. 8-10 are perspective views of a cycloidal propeller of the amphibious vehicle of FIG. 1.
Figure 9:
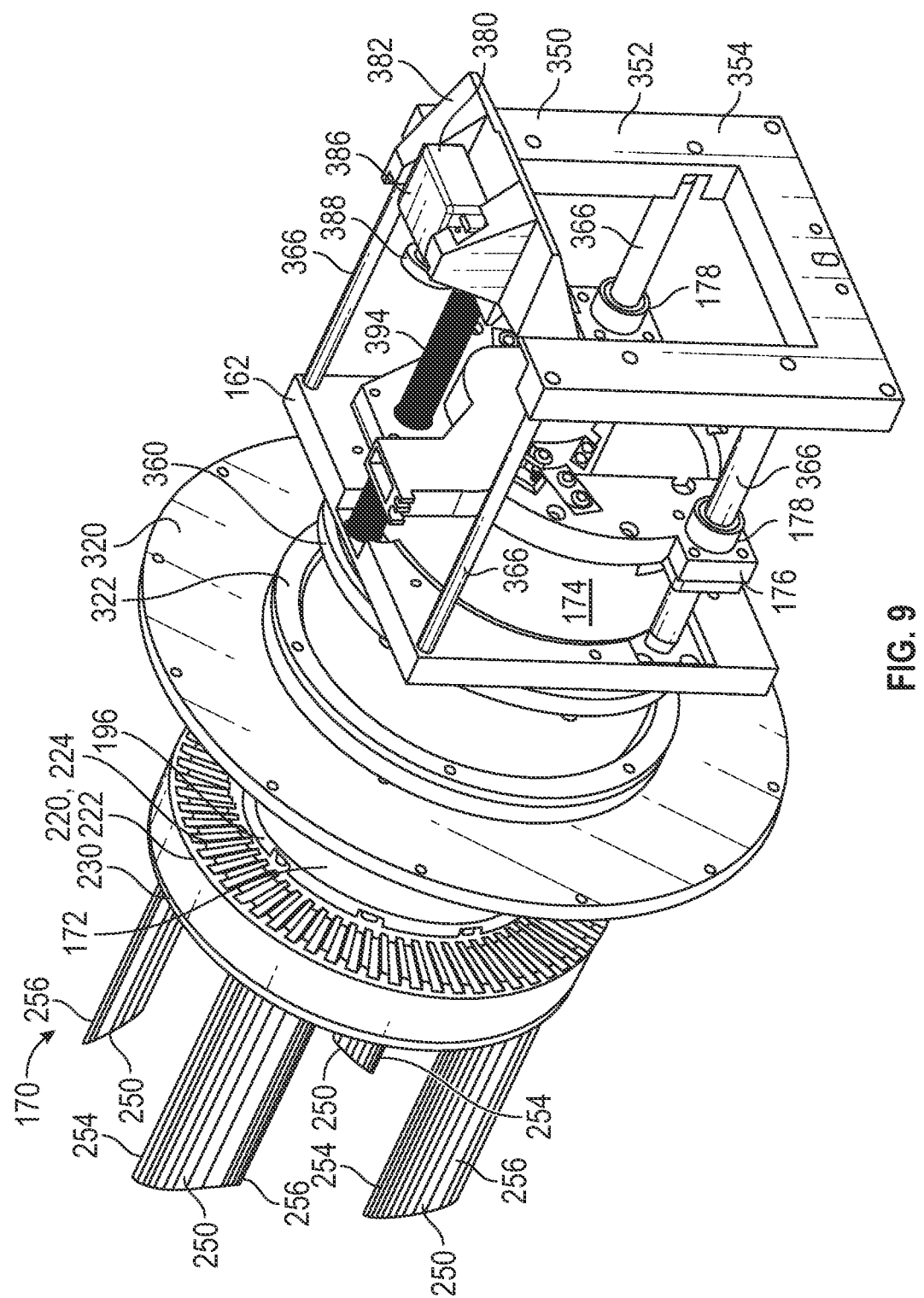
Figure 10:
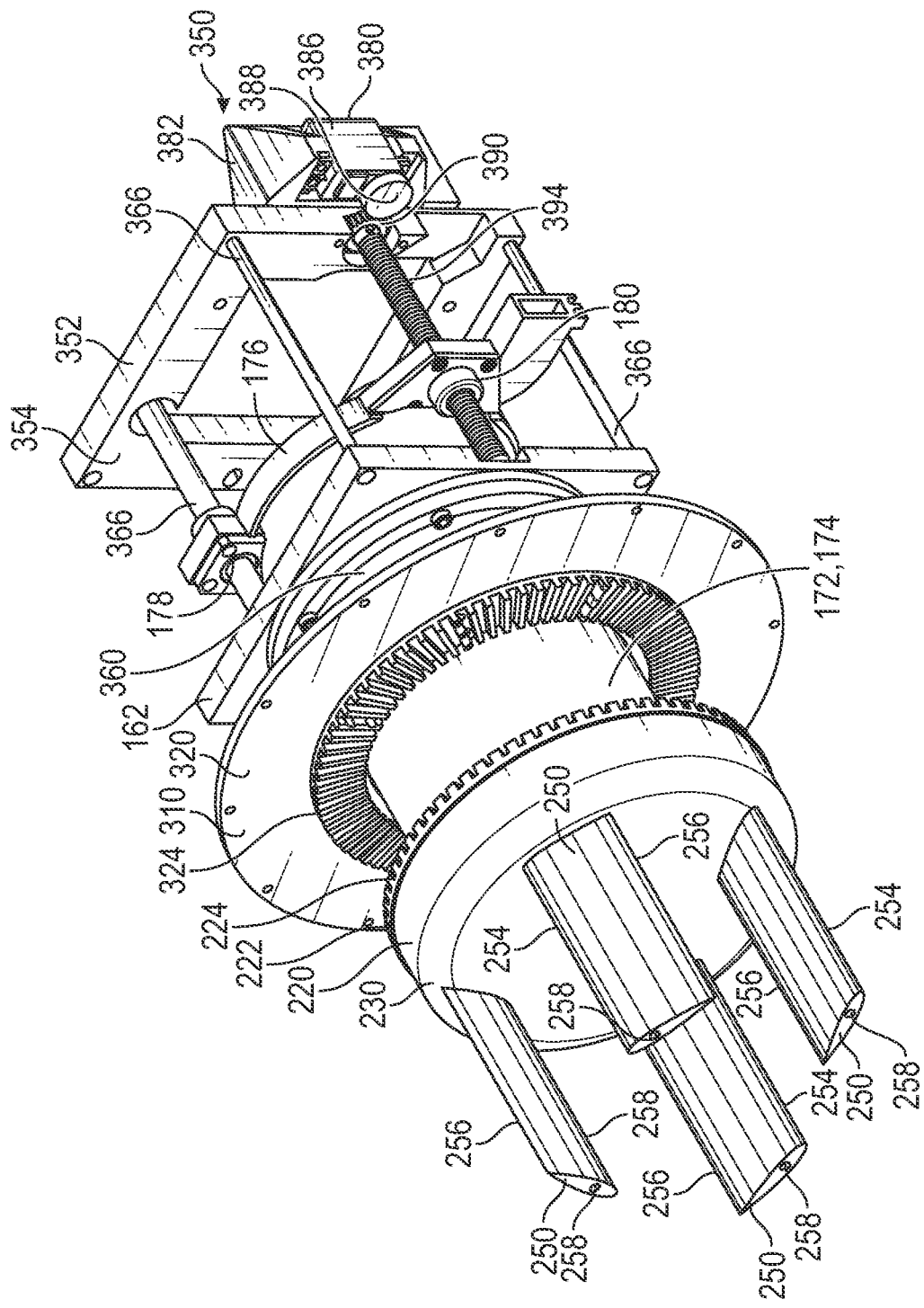
Figure 11:
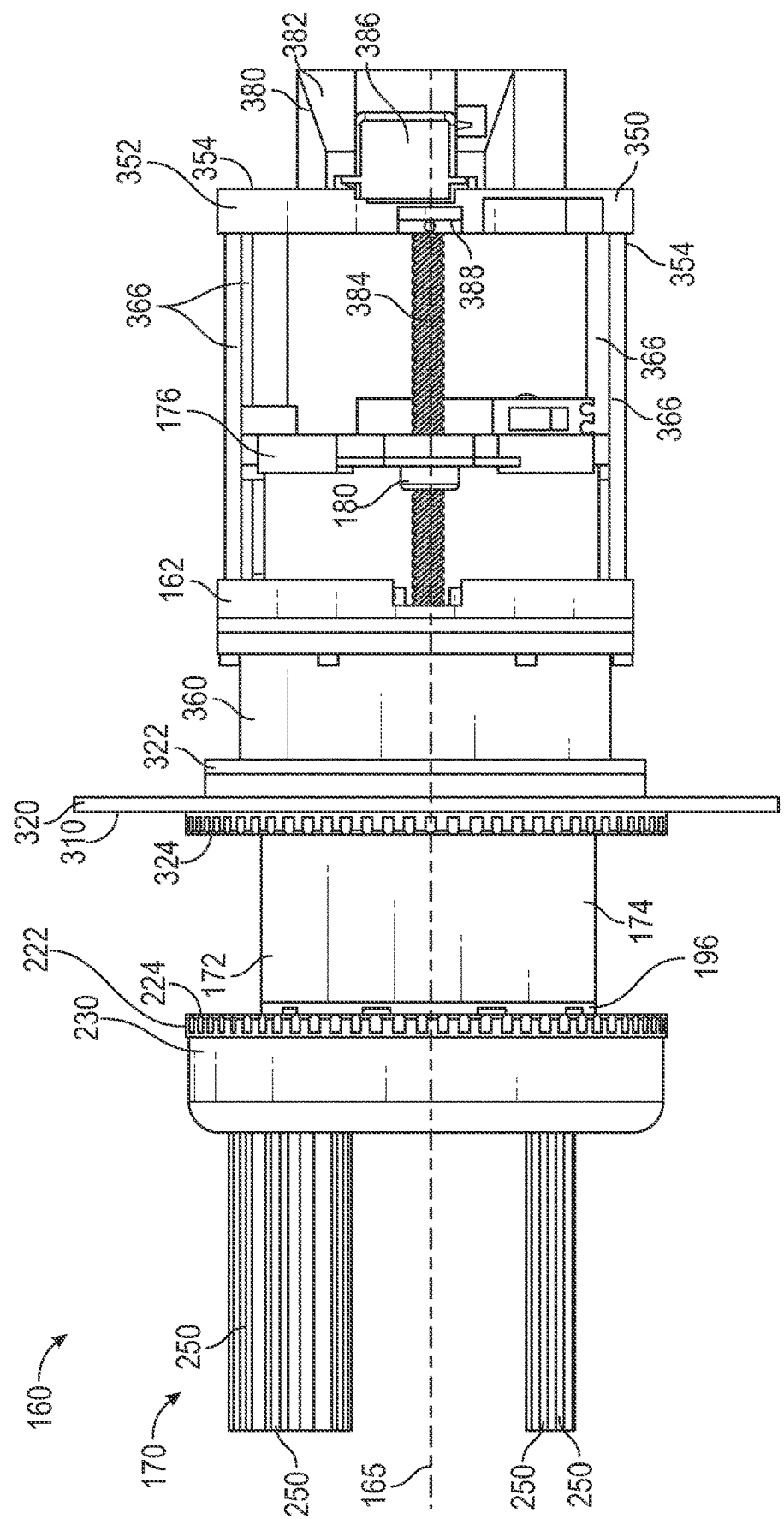
FIG. 11 is a top view of the cycloidal propeller of FIGS. 8-10.
Figure 12:
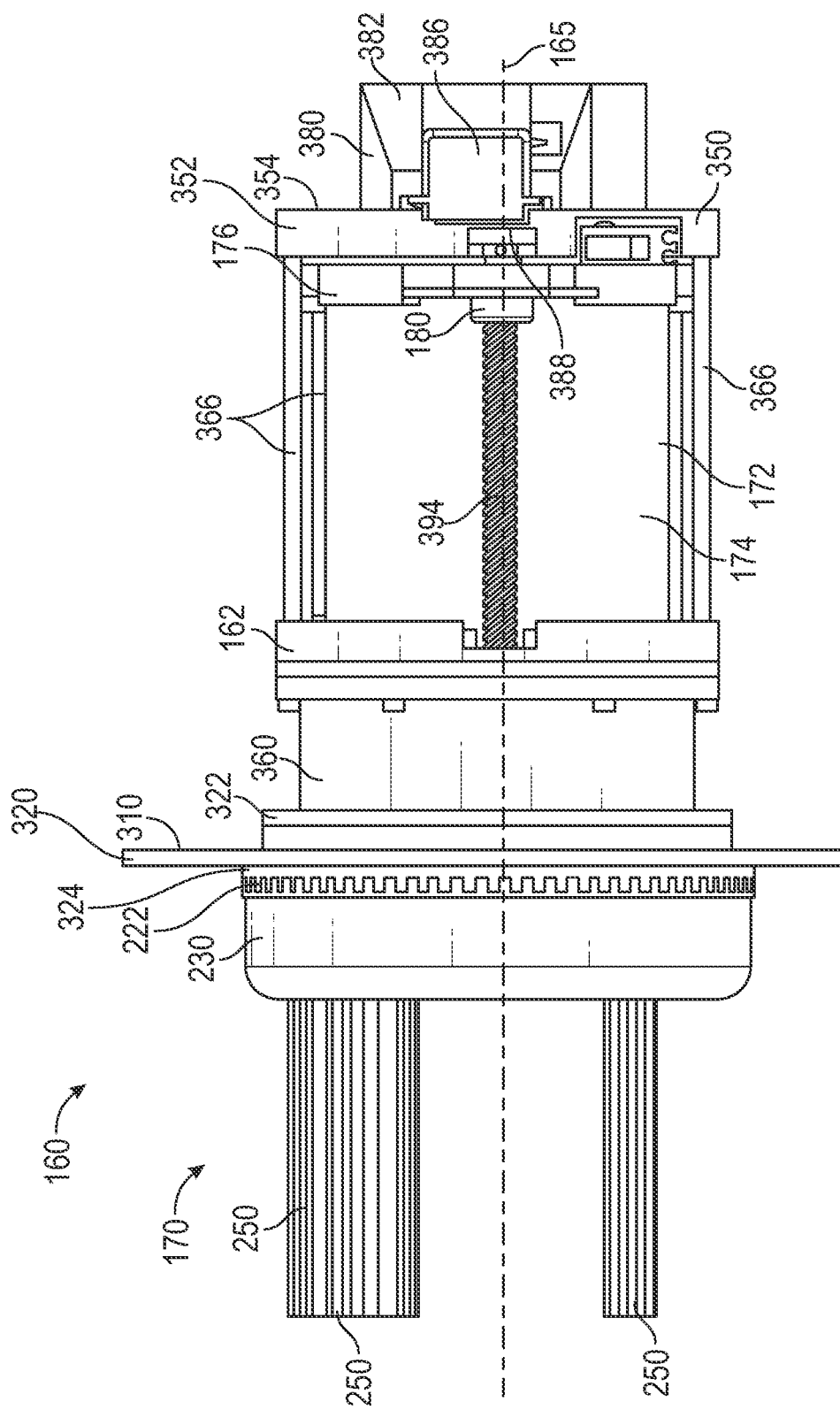
FIG. 12 is a top view of the cycloidal propeller of FIGS. 8-10 with cycloidal propeller blades thereof in a retracted position.

In some embodiments, the body of embodiments of amphibious vehicles described herein may comprise one or more fluid dynamic surface features configured to stabilize amphibious vehicle during land and/or water modes of operation. For example, referring briefly to FIG. 6, another embodiment of an amphibious vehicle 480 is shown. Amphibious vehicle 480 is similar to amphibious vehicle 450 shown in FIG. 5 except that amphibious vehicle 480 includes a chassis 482 comprising a pair of control surfaces 484 positioned on an exterior thereof and configured to stabilize the motion of amphibious vehicle 480 when operating in at least one of the land and water modes of operation by interacting with a flow of fluid (e.g., air, water) flowing around the body 482 of amphibious vehicle 480. Control surfaces 484 may comprise passive or stationary control surfaces (e.g., a stationary fin or spoiler) or an active control surface which may be actuated or adjusted by a control system of amphibious vehicle 480 during operation. In this exemplary embodiment, fluid dynamic features 484 comprise a pair of spoilers 486 extending from upper and lower surfaces 488, 490 of body 482 at a rear 481 of the amphibious vehicle 480. In other embodiments, one or both of the fluid dynamic features 484 may comprise a fin for stabilizing the motion of amphibious vehicle 480 in water. The fin may be fixed or retractable into the body 482 of amphibious vehicle 480 when vehicle is operating on land.

Referring again to FIGS. 1-3, chassis 102 of amphibious vehicle 100 additionally includes a plurality of wheel wells 110 in which at least a portion of the cycloidal propellers 160 of amphibious propulsion system 150 is received. As shown particularly in FIGS. 2, 3, each wheel well 110 is partially defined by a planar propeller mounting plate 112 of chassis 102. In this exemplary embodiment, each cycloidal propeller 160 is coupled or mounted to a corresponding propeller mounting plate 112 of chassis 102 thereby coupling cycloidal propellers 160 with chassis 102. Additionally, each propeller mounting plate 112 comprises a generally cylindrical aperture through which one of the cycloidal propellers 160 extends.

In this exemplary embodiment, control system 145 and power supply 148 (control system 145 and power supply 148 each shown schematically in FIGS. 2, 3) are each located within chassis 102 between compartments 104, 106 such that control system 145 and power supply 148 are each supported by and coupled to chassis 102. While in this exemplary embodiment control system 145 and power supply 148 are each located between compartments 104, 106, in other embodiments, control system 145 and/or power supply 148 may be disposed at various locations on and/or within chassis 102 depending on the particular configuration of chassis 102 and amphibious vehicle 100.

Control system 145 is generally configured to control the operation of propulsion systems 140, 160 of amphibious vehicle 100 to thereby control the orientation, direction, and speed of amphibious vehicle 100 in both land and water (submerged and at the water surface) modes of operation as will be described further herein. Control system 145 may comprise a computer system, one or more sensors, and/or a wireless transmitter. For example, control system 145 may comprise sensors for monitoring various parameters of water propulsion system 140 and amphibious propulsion system 150.

In some embodiments, a human pilot may operate amphibious vehicle 100 remotely via control system 145. For example, in some embodiments, amphibious vehicle 100 may comprise one or more sensors such as, for example, a camera, and a transmitter which may transmit images provided by the camera to the remote operator. The remote operator may in turn transmit control signals to the amphibious vehicle 100 as the operator receives data (e.g., image or video data) from the amphibious vehicle 100. In other embodiments, control system 145 may operate amphibious vehicle 100 autonomously such as in accordance with a pre-programmed directive or operational plan stored in a memory device of the control system 145. In this exemplary embodiment, control system 145 comprises a feedback controller configured to automatically stabilize any unstable dynamic modes or instabilities of amphibious vehicle 100 when in the land and/or water operational modes.

Power supply 148 of amphibious vehicle 100 supplies power to the control system 145 and propulsion systems 140, 150. Thus, in at least some embodiments, both water propulsion system 140 and amphibious propulsion system 150 are powered by the same single power supply 148. In some embodiments, power supply 148 may comprise an electrical power supply such as a battery pack. In other embodiments, the configuration of power supply 148 may vary. For example, in other embodiments, power supply 148 may comprise an electrical generator powered by an onboard fuel source.

Referring to FIGS. 1-3, 8-14, one of the cycloidal propellers 160 of the amphibious vehicle of FIGS. 1-3 is shown in FIGS. 8-14. Although only a single cycloidal propeller 160 is shown in FIGS. 8-14, it may be understood that each of the cycloidal propellers 160 of amphibious vehicle 100 is similarly configured. In this exemplary embodiment, cycloidal propeller 160 generally includes a mounting plate 162, a powertrain 170 and an extension/retraction system 350. Each cycloidal propeller 160 has a central or longitudinal axis 165 which extends orthogonal the central axis 105 of amphibious vehicle 100. Mounting plate 162 of cycloidal propeller 160 couples to the propeller mounting plate 112 of one of the wheel wells 110 of chassis 102 to thereby couple the cycloidal propeller 160 with chassis 102. For example, in some embodiments, one or more fasteners may extend through both mounting plate 162 of the cycloidal propeller 160 and the propeller mounting plate 112 of chassis 102 to couple cycloidal propeller 160 with chassis 102.

In this exemplary embodiment, the powertrain 170 of cycloidal propeller 160 generally includes a hub 172, a drive motor 200, a transmission or gearbox 210, a rotor 220, a plurality of cycloidal propeller blades 250, a blade pitching system 270, and a rim 310. Hub 172 of powertrain 170 generally includes a cylindrical outer shell 174, a base plate 176, and an endcap 196. Base plate 176 is coupled to a first or inner end of shell 175 while endcap 196 is coupled to an opposing second or outer end of shell 174. As shown particularly in FIG. 9, base plate 176 of hub 172 includes an opening 177, a pair of bearings (e.g., linear ball bearings, etc.) received in arms of hub 172 which are radially offset from the central axis 165 of cycloidal propeller 160. Base plate 176 additionally includes an internally threaded nut 180 received in another radially offset arm (circumferentially offset from the pair of bearings 178) of base plate 176. As will be described further herein, nut 180 interacts with the extension/retraction system 350 to linearly extend and retract powertrain 170 of cycloidal propeller 160 along the central axis 165 thereof.

Figure 13:
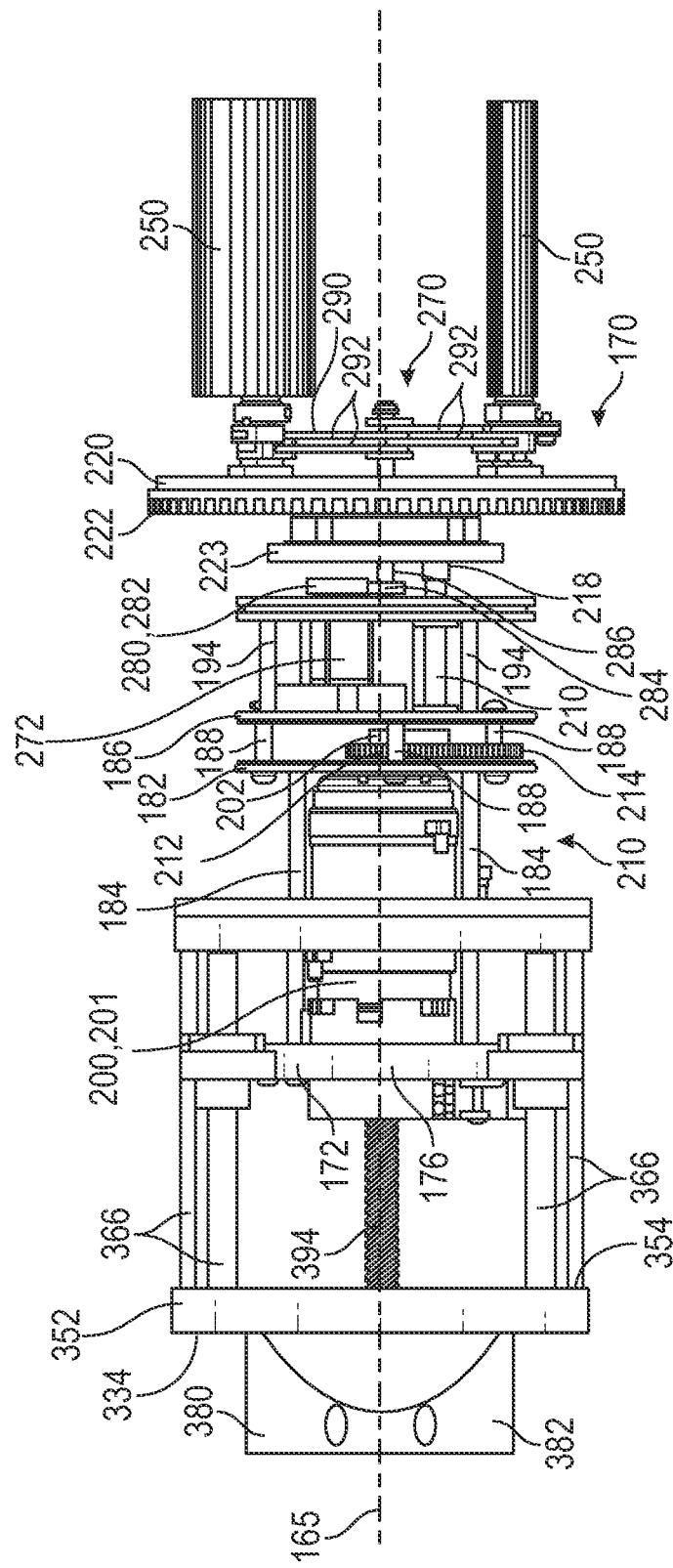
FIG. 13 is a bottom view of a powertrain of the cycloidal propeller of FIGS. 8-10.

As shown particularly in FIG. 13, in this exemplary embodiment, hub 172 additionally includes a plurality of cylindrical internal support plates 182, 186, and 192 received within the shell 174 thereof (shell 174 is hidden in FIG. 13). Particularly, hub 172 includes a motor support plate 182 which is connected to base plate 176 by a plurality of circumferentially spaced support rods 184. Additionally, a servo support plate 186 is connected to motor support plate 182 by a plurality of circumferentially spaced support rods 188. Further, an outer support plate 192 is connected to servo support plate 186 by a plurality of circumferentially spaced support rods 194. Internal support plates 182, 186, and 192 provide structural rigidity to hub 172 and physically support components housed therein as will be described further herein.

Also as shown particularly in FIG. 13, drive motor 200 is received within the hub 172 of powertrain 170. Drive motor 200 is generally configured to rotate the plurality of cycloidal propeller blades 250 about the central axis 160 of cycloidal propeller 160. Thus, in this exemplary embodiment, central axis 165 comprises a rotational axis 165 of cycloidal propeller 160; however, in other embodiments, the rotational axis of cycloidal propeller 160 may be radially offset from the central axis 165 of propeller 160. Additionally, drive motor 200 may rotate cycloidal propeller blades 250 about central axis 165 across a range of rotational speeds or RPM as controlled by the control system 145 of amphibious vehicle 100. Further, drive motor 200 may rotate cycloidal propeller blades 250 in both opposing rotational directions (e.g., clockwise and counterclockwise) In this exemplary embodiment, drive motor 200 comprises an electric motor powered electrically (e.g., via supplying an input voltage) by power supply 148; however, in other embodiments, drive motor 200 may comprise motors other than electric motors.

In this exemplary embodiment, drive motor 200 comprises an outer housing 201 including a first or inner end that is coupled to the base plate 176 of hub 172 and an opposing second or outer end that is coupled to the motor support plate 182 of hub 172. In this arrangement, electrical wiring may pass through the opening 177 of base plate 176 and connect to the inner end of motor housing 201. Drive motor 200 additionally includes an output shaft 202 extending from the outer end of housing 201 and which is configured to rotate relative to motor housing 201 about the central axis 165 of cycloidal propeller 160.

A first or drive gear 212 of the transmission 210 is coupled to an end of the output shaft 202 of drive motor 200. Drive gear 212 comprises a plurality of gear teeth which are enmeshed with a plurality of gear teeth of an input gear 214 of transmission 210 rotatably coupled with drive gear 212. Input gear 214 is coupled to a first or inner end of a drive shaft 216 of transmission 210. Drive shaft 216 extends through openings formed in internal support plates 186, 192 of hub 172. Additionally, an output gear 218 of transmission is coupled to an opposing second or outer end of drive shaft 216. Output gear 218 is rotatably coupled with the rotor 220 of powertrain 170 and thereby is configured to drive the rotation of rotor 220 in response to the actuation of drive motor 200. A ratio of a rotational speed or RPM of the output shaft 202 of drive motor 200 and a rotational speed or RPM of rotor 220 may be tailored to provide a desired gear ratio by varying the size or number of gear teeth of gears 212, 214, and 218 of transmission 210.

Rotor 220 of powertrain 170 is generally configured to transmit rotational torque and movement from transmission 210 to the cycloidal propeller blades 250 when amphibious vehicle is in the water operational mode. Additionally, rotor is configured to transmit rotational torque and movement from transmission 210 to rim 310 when amphibious vehicle is in the land operational mode. In this exemplary embodiment, rotor 220 comprises a backplate 222 and a front plate 230 (front plate 230 is hidden in FIGS. 13, 14) coupled end-to-end. Backplate 222 is geared to the output gear 218 of transmission 210 such that rotation of the output shaft 202 of drive motor 200 results in corresponding rotation of rotor 220 in the same rotational direction of output shaft 202 and at a rotational speed determined by the rotational speed of output shaft 202 and the gear ratio provided by transmission 210. Particularly, backplate 222 is coupled to a ring gear 223 which is rotatably coupled or geared to output gear 218. One or more bearings (e.g., a thrust bearing, etc.) may be positioned between the backplate 222 of rotor 220 and the endcap 196 of hub 172 to allow for relative rotation therebetween. In this exemplary embodiment, a first or rotor clutch plate 224 is connected to a rear or inner face of the backplate 222 of rotor 220. Rotor clutch plate 224 comprises a plurality of circumferentially spaced, radially extending (relative central axis 160) rotor clutch teeth. As will be described further herein, rotor clutch plate 224 may selectably transfer rotational torque and motion to the rim 310 of cycloidal propeller 160 when amphibious vehicle 100 is in the land operational mode.

The front plate 230 of rotor 220 houses at least a portion of the blade pitching system 270. Additionally, front plate 230 (along with backplate 222) is coupled to the cycloidal rotor blades 250 such that relative axial and radial movement between rotor 220 and blades 250 is restricted. However, as will be discussed further herein, blade pitching system 270 may selectably rotate each of the cycloidal propeller blades 250 relative to the rotor 220 as the rotor 220 and blades 250 rotate in concert about the central axis 165 of cycloidal propeller 160.

Figure 14:
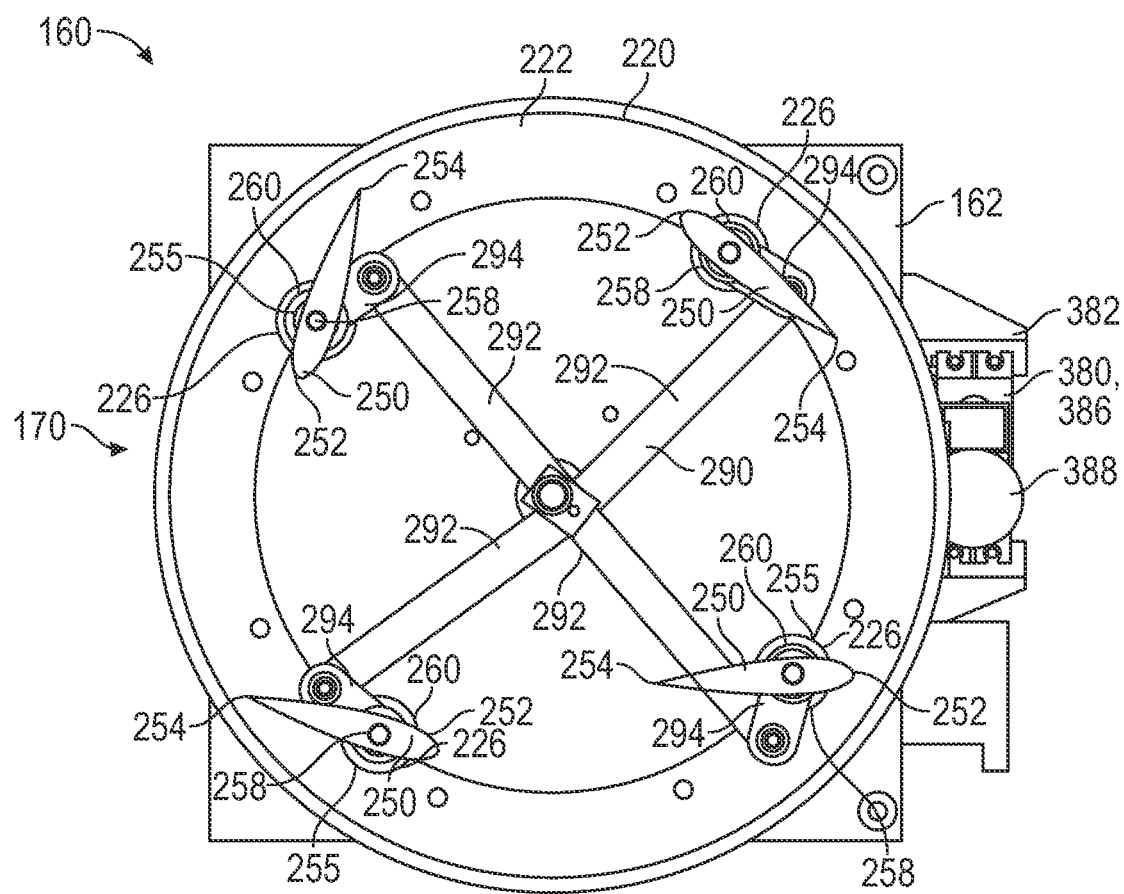
FIG. 14 is a front view of the cycloidal propeller of FIGS. 8-10.

As shown particularly in FIG. 14, each cycloidal propeller blade 250 has a central or longitudinal axis 255 (extending out of the page in FIG. 14) and comprises an airfoil cross-sectional profile including a leading edge 254 and a trailing ledge 256 opposite the leading edge 254. Additionally, a blade shaft 258 extends from each cycloidal propeller blade 250 towards rotor 220 along the central axis 255 of the cycloidal propeller blade 250. Blade shaft 258 extend through openings formed in 230 front plate 230 of rotor 200 and a terminal end of each blade shaft 258 is received within a bearing (e.g., a ball bearing, etc.) located in a receptacle 226 formed in a front or outer face of the backplate 222 (opposite of the face which connects to rotor clutch plate 224) of rotor 220. In this configuration, cycloidal propeller blades 250 rotate in concert with rotor 220 but are permitted to rotate relative to rotor 220 about their respective central axes 255 via bearings 260.

Figure 15:
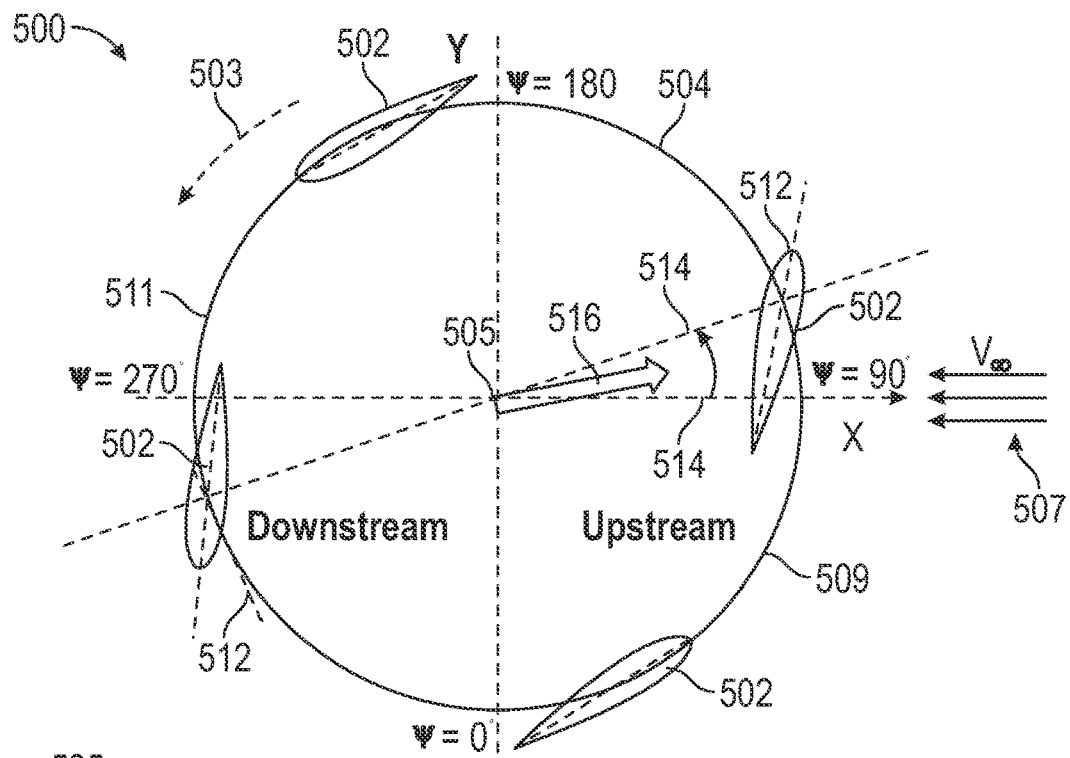
FIG. 15 is an exemplary kinematic diagram of a cycloidal propeller.

Blade pitching system 270 is generally configured to selectably alter an amplitude and a phase of a cyclic blade pitch of the cycloidal propeller blades 250 to thereby control a magnitude and a direction of a thrust produced by cycloidal propeller blades 250 as they rotate about the central axis 165 of the cycloidal propeller 160. For example, referring to FIG. 15, a diagram 500 of exemplary blade kinematic of a cycloidal propeller is shown. Diagram 500 illustrates a plurality of cycloidal propeller blades 502 rotating (indicated by arrow 503 in diagram 500) about an azimuth 504 extending about a rotational axis 505. Additionally, the cycloidal propeller comprising blades 502 is travelling in a direction 507 such that azimuth 504 includes an upstream half 509 and a downstream half 511 opposite upstream half 509. A blade pitch angle of each cycloidal propeller blade 502 is varied cyclically as the blade 502 travels about the azimuth 504 such that a maximum pitch angle 512 of the blade 502 is achieved at a phase angle 514 at both the upstream and downstream halves 509, 511 of azimuth 504. The cyclic blade pitching of the rotating cycloidal propeller blade 502 produces a thrust vector 516 extending orthogonal to the rotational axis 505.

A magnitude of the thrust vector 516 may be based on the rotational speed of cycloidal propeller blades 502 about the rotational axis 505, the size and/or shape of each cycloidal propeller blade 502, and the magnitude of the maximum pitch amplitude 512. Thus, the magnitude of thrust vector 516 may be dynamically changed in response to a change in the rotational speed or RPM of cycloidal propeller blades 502 and/or a change in the magnitude of the maximum pitch angle 512. A direction of the thrust vector 516 extending from the rotational axis 505 is based on the phase angle 514 at which the maximum pitch angle 512 of cycloidal propeller blades 502 is achieved. Thus, the direction of thrust vector 516 may be rotated 360 degrees about the entirety of azimuth 504 by dynamically adjusting the phase angle 514.

Referring again to FIGS. 1-3, 8-14, in this exemplary embodiment, blade pitching system 270 generally includes an actuator or servo motor 272, a transmission 280, and a four-bar linkage system 290, as shown particularly in FIGS. 13, 14. While in this embodiment blade pitching system 270 comprises four-bar linkage system 290, in other embodiments, blade pitching system 270 may comprise other mechanisms (e.g., cams, gears, etc.) for cyclically varying pitch angle. Servo motor 272 is coupled or mounted against the servo support plate 186 of hub 172. Servo motor 272 comprises an output shaft which may be rotated in each opposing rotational direction (e.g., clockwise and counterclockwise) about a rotational axis of servo motor 272. In this exemplary embodiment, servo motor 272 comprises an electric motor powered by the power supply 148 and controlled by the control system 145 of amphibious vehicle 100; however, in other embodiments, the configuration of servo motor 227 may vary.

Transmission connects the output shaft of servo motor 272 with linkage system 290. In this exemplary embodiment, transmission comprises a first gear 282, a second gear 284, and a pivot shaft 286. First gear 282 is coupled or otherwise formed at an end of the output shaft of servo motor 272 and comprises a plurality of gear teeth which are enmeshed with a plurality of gear teeth of second gear 284. Second gear 284 is coupled or otherwise formed at an end of the pivot shaft 286 which is connected directly to the linkage system 290. In this configuration, the size or number of teeth of gears 284, 286 defines a gear ratio between the output shaft of servo motor 272 and pivot shaft 286 provided by the transmission 280 of blade pitching system 270.

The pivot shaft 286 of transmission 280 extends rotatably through the backplate 222 of rotor 220 via a bearing (e.g., a ball bearing, etc.) positioned therebetween and into a cavity formed within the front plate 230 of rotor 220. An end of the pivot shaft 286 is coupled to a plurality of linkage arms 292 of the linkage system 290 which extend generally radially away from the pivot shaft 286. Each linkage arm 292 connects to a pivot arm 294 of linkage system 290 connected to a blade shaft 258 of one of the cycloidal propeller blades 250. The coupling of pivot shaft 286 with linkage arms 292 is offset from a rotational axis of pivot shaft 286 whereby rotation of pivot shaft 286 results in displacement of linkage arms 294 and thereby rotation of pivot arms 294.

Rotation of pivot arms 294 is transmitted to blade shafts 256 whereby rotation of pivot shaft 286 results in the rotation of each cycloidal propeller blade 250 about its respective pitch axis 255. In this manner, servo motor 272 may be operated by control system 145 of amphibious vehicle 100 to cyclically control the pitch and phase angles of cycloidal propeller blades 250 and thereby instantaneously control both a magnitude and a direction of a thrust vector generated by cycloidal propeller 160 when propeller 160 is rotated about central axis 165, the thrust vector extending orthogonal central axis 165. Particularly, blade pitching system 270 of cycloidal propeller 160 allows for the direction of the thrust vector generated by propeller 160 to be oriented at any angle about central axis 165, providing amphibious vehicle with six degrees-of-freedom (DOF) when travelling underwater in the water operational mode.

Figure 16:
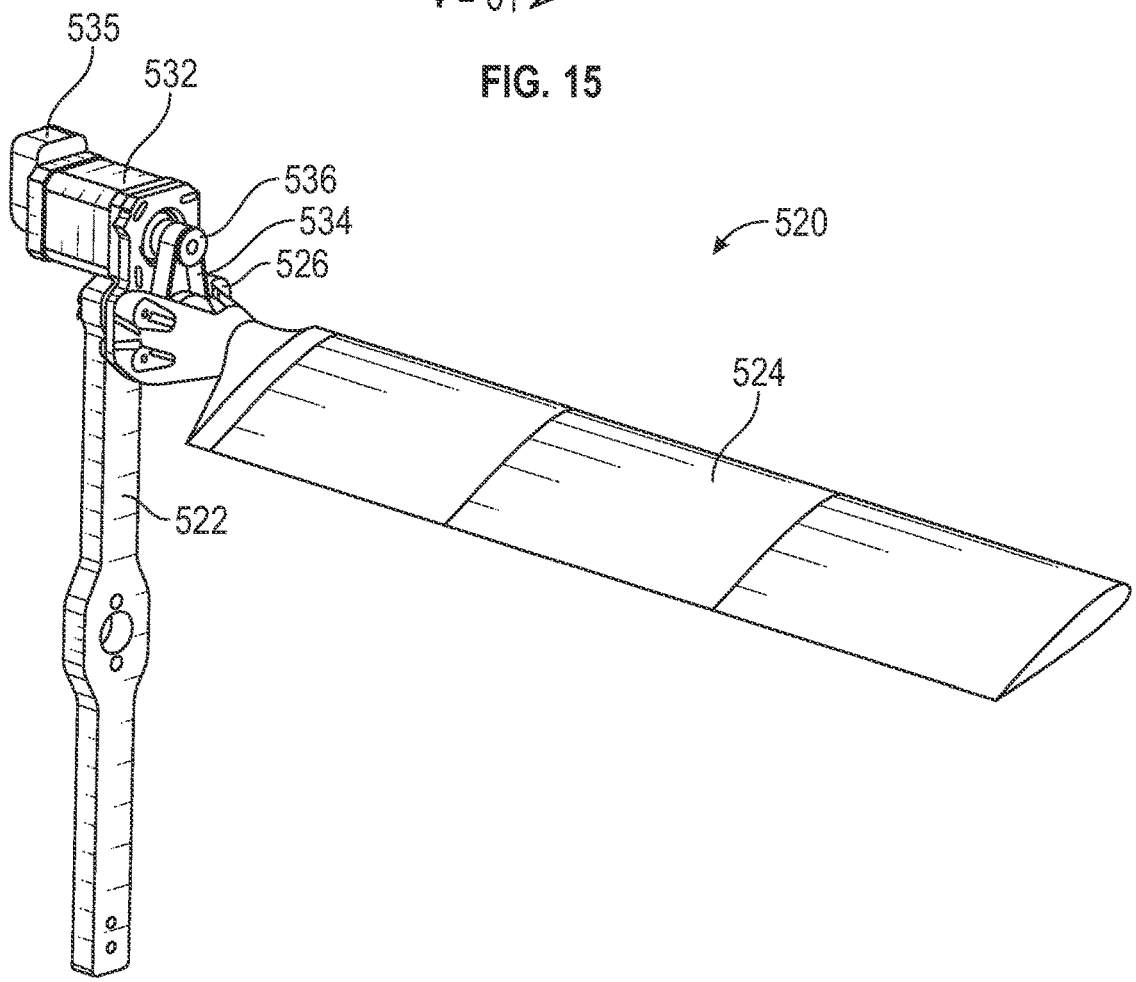
FIG. 16 is an embodiment of cycloidal propeller blade assembly.

In this exemplary embodiment, blade pitching system 270 comprises a passive pitching system in that the pitch angle (relative to the azimuth along which cycloidal propeller blades 250 travel) of cycloidal propeller blades 250 may only be controlled collectively, not individually, by servo motor 272. However, in other embodiments, cycloidal propeller blades 250 may be individually and dynamically controlled. For example, referring briefly to FIG. 16, an embodiment of a cycloidal propeller blade assembly 520 is shown. Cycloidal propeller blade assembly 520 generally includes a blade mount 522, a cycloidal propeller blade 524 coupled to the blade mount 522, and a pitching servo 532 coupled to a blade shaft 526 of the cycloidal propeller blade. Particularly, pitching servo 532 is coupled to blade shaft 526 by a belt 534 which extends about an output shaft 536 of pitching servo 532.

Pitching servo 532 is coupled to a sensor 535 configured to measure one or more parameters pertaining to the cycloidal propeller blade 524. For example, sensor 535 may determine the pitch angle of the cycloidal propeller blade 524 of the cycloidal propeller blade assembly 520. Additionally, sensor 535 may monitor forces, such as, for example, hydrodynamic forces, applied to cycloidal propeller blade 524 by the surrounding environment in response to the rotation of cycloidal propeller blade 524 about a rotational axis. In some embodiments, a control system (e.g., control system 145) may control the operation of servo motor 272 based on the forces applied to the cycloidal propeller blade 524 and/or the angular position and pitch angle of cycloidal propeller blade 524.

In this configuration, pitching servo 532 may individually control a pitch angle of cycloidal propeller blade 524 at any given moment in time. Thus, a cycloidal propeller comprising a plurality of cycloidal blade assemblies 520 may allow for individual control of the pitch angle of each cycloidal propeller blade 524 rather than common or passive control. Individual control of each cycloidal propeller blade 524 may allow for more precise control over the desired magnitude and direction of thrust generated by the cycloidal propeller as the pitch angle of each cycloidal propeller blade 524 may be controlled by its own individual control loop.

Referring again to FIGS. 1-3, 8-14, rim 310 of cycloidal propeller 160 is generally configured to receive rotational torque and motion from drive motor 200 to propel amphibious vehicle 100 when in the land operational mode. In this exemplary embodiment, rim 310 generally includes a cylindrical wheel 312 (hidden in FIGS. 9-14), and an annular rim mount 320. In some embodiments, wheel 312 may comprise or couple to a tire configured to provide traction and thereby propel amphibious vehicle 100 across land. In this exemplary embodiment, wheel 312 comprises a tracked wheel which couples to a tank tread 314 (shown in FIGS. 1-3) extending about the shells 312 of a pair of cycloidal propellers 160 positioned along a lateral side 109/111 of amphibious vehicle 100. The configuration of wheel 312 may differ from a tire or tracked wheel in still other embodiments.

An outer face of rim mount 320 couples to an inner end of wheel 312 such that rim mount 320 is rotationally locked to wheel 312. As shown particularly in FIGS. 9, 10, rim mount 320 is rotatably positioned about a support collar 360 of extension/retraction system 350 (which will be described further herein) via an annular bearing 322 (e.g., a roller bearing, etc.) positioned radially between support collar 360 and rim mount 320 thereby allowing relative rotation between rim mount 320 and support collar 360. Additionally, a second or rim clutch plate 324 is connected to the front face of rim mount 320. Rim clutch plate 324 comprises a plurality of circumferentially spaced, radially extending (relative central axis 160) rim clutch teeth configured to matingly engage the clutch teeth of the rotor clutch plate 224. Particularly, when cycloidal propeller blades 250 are in an extended position as shown in FIGS. 1-3, 8-14, rotor clutch plate 224 is axially spaced (along central axis 165) from the rim clutch plate 324 of rim 320 such that torque may not be transmitted from rotor 220 to rim 320. However, when cycloidal propeller blades 250 are in a retracted position (shown in FIG. 12) rotor clutch plate 224 engages rim clutch plate 324 such that rotational torque and motion is transmitted from rotor 220 to the rim 320. In this manner, power supplied to cycloidal propellers 160 when amphibious vehicle 100 in the water operational mode may be directed only to cycloidal propeller blades 250, maximizing the efficiency of the cycloidal propellers 160 when in the water operational mode. Additionally, when in the land operational mode cycloidal propeller blades 250 are retracted into a central opening or cavity 313 formed within wheel 312 of rim 310, thereby protecting cycloidal propeller blades 250 from damage when amphibious vehicle 100 is in the land operational mode.

Still referring to FIGS. 1-3, 8-14, the extension/retraction system 350 of cycloidal propeller 160 is configured to actuate cycloidal propeller blades 250 between the extended and retracted positions described above. The operation of extension/retraction system 350 may be controlled by control system 145 and powered by power supply 148 of amphibious vehicle 100. In this exemplary embodiment, extension/retraction system 350 generally includes a central reaction mount 352, a support collar 360, and a linear actuator 380. Reaction mount 352 comprises a rectangular plate having a pair of opposing support surfaces 354; however, in other embodiments, the configuration of reaction mount 352 may vary. As shown particularly in FIGS. 1-3, reaction mount 352 is shared between a pair of cycloidal propellers 160 disposed along the same central axis 165. Thus, in this exemplary embodiment, amphibious vehicle comprises a pair of reaction mounts 352 shared between two pairs of cycloidal propellers 160, the two pairs of cycloidal propellers 160 being spaced along the central axis 105 of amphibious vehicle 100.

Support collar 360 of extension/retraction system 350 physically supports powertrain 170 when cycloidal propeller blades 250 are in both the extended and retracted positions. In this exemplary embodiment, support collar 360 comprises a cylindrical sleeve which couples to mounting plate 162 which may comprise a component of extension/retraction system 350. In some embodiments, an elastomeric O-ring may be positioned at an annular interface between mounting plate 162 and the shell 174 of hub 172. A plurality of support rods 366 extend between mounting plate 162 and one of the support surfaces 354 of reaction mount 352 thereby coupling mounting plate 162 with reaction mount 352 such that reaction mount 352 is affixed to chassis 102 of amphibious vehicle 100. At least some of the support rods 366 extend through the bearings of the base plate 176 of hub 172 to stabilize the position of hub 172 relative to extension/retraction system 350.

Support rods 366 also affix support collar 360 to chassis 102 of amphibious vehicle 100 such that support collar 360 remains stationary relative to chassis 102 as cycloidal propeller blades 250 are actuated between the retracted and extended positions. Given that rim 310 is positioned on support collar 360, rim 310 also remains stationary relative to chassis 102 when the cycloidal propeller blades 250 are actuated between the retracted and extended positions, thereby allowing rotor 220 to rotatably couple with rim 310 when cycloidal propeller blades 250 are actuated into the retracted position.

The linear actuator 380 of extension/retraction system 350 generally includes an actuator mount 382, a servo motor 386, a transmission comprising a pair of gears 388, 390, and an actuator rod 394. Actuator mount 382 is supported on one of the support surfaces 354 of reaction mount 352 thereby coupling linear actuator 380 to reaction mount 352. As shown particularly in FIGS. 2, 3, the actuator mount 382 of a first cycloidal propeller 160 of a pair of propellers 160 extending along a shared central axis 165 is supported on a first support surface 354 of a first reaction mount 352 while the actuator mount 382 of the second cycloidal propeller 160 of the pair of propellers 160 is supported on a second, opposing support surface 354 of the first reaction mount 352.

Servo motor 386 may rotate an output shaft thereof in a first rotational direction to actuate cycloidal propeller blades 250 from the extended position to the retracted position, and in a second rotational direction, opposite the first rotational direction, to actuate cycloidal propeller blades 250 from the retracted position to the extended position. Particularly, rotation of the output shaft of servo motor 386 is transmitted to the actuator rod 394 via gears 388, 390 which define a gear ratio between the actuator rod 395 and the output shaft of servo motor 386. Rotation of actuator rod 394 is converted into linear motion of hub 372 along central axis 165 via threaded engagement between external threads formed on actuator rod 394 and internal threads formed on the threaded nut 180 of base plate 176. The linear motion of hub 372 induced by the actuation of servo motor 386 also results in the linear motion of rotor 220, cycloidal propeller blades 250, and blade pitching system 270 given that rotor 220, blades 250, and pitching system 270 are each physically supported and coupled to hub 372. Further, as described above, rim 310 does not travel linearly along central axis 165 in concert with hub 172 given that rim 310 is rotatably supported on and coupled to support collar 360 which is held stationary by mounting plate 162.

As described above, control system 145 of amphibious vehicle 100 controls the operation of cycloidal propellers 160. Particularly, control system 145 may control the orientation or direction of amphibious vehicle (with two DOFs when in the land operational mode and up to six DOFs (e.g., pitch, roll, yaw, forwards translation along central axis 105, reverse or backwards translation along central axis 105, upwards or downwards vertical translation, and leftwards or rightwards lateral translation when submerged in the water operational mode) when in both the land and water operational modes by altering the magnitude of the thrust vector produced by each cycloidal propeller and/or altering the radial direction of the thrust vector (extending orthogonally from the central axis 165 of the cycloidal propeller 160) via the blade pitching system 270 of the cycloidal propeller 160.

Figure 17:
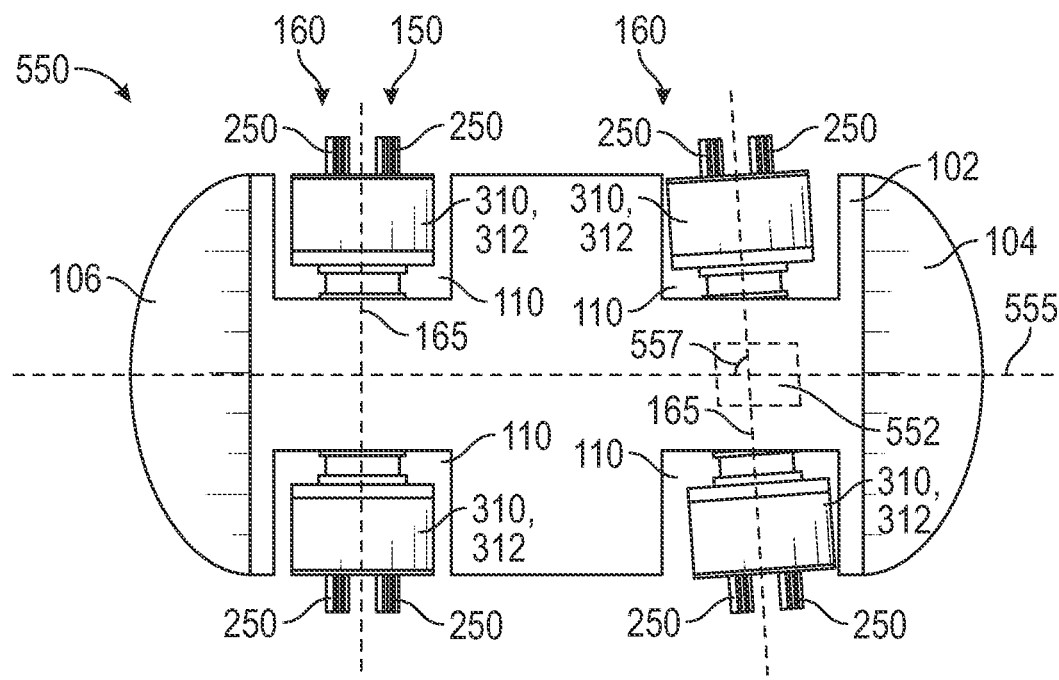
FIG. 17 is a top view of another embodiment of an amphibious vehicle.

While in this exemplary embodiment the central axes 165 of cycloidal propellers 160 may not be rotated relative to chassis 102 to assist with controlling amphibious vehicle 100 when in the land and/or water operational modes, in other embodiments, at least one of the pairs of cycloidal propellers 160 may be steered relative to chassis 102 by the control system 145. For example, referring briefly to FIG. 17, another embodiment of an amphibious vehicle 550 is shown. Amphibious vehicle 550 is similar to amphibious vehicle 100 shown in FIGS. 1-3 except that amphibious vehicle 550 includes a steering actuator 552 (shown schematically in FIG. 17) configured to rotate the central axis 165 shared by a pair of the cycloidal propellers 160 of amphibious vehicle 100 relative to the chassis 102 of amphibious vehicle 550. Particularly, steering actuator 552 rotates the central axis 165 of the pair of cycloidal propellers 160 about a vertical axis orthogonal to a longitudinal or central axis 555 of amphibious vehicle 550. In this manner, the steering actuator 552 may dispose the central axis 165 at a non-zero, non-orthogonal angle (e.g., an acute angle) 557 relative to the central axis 555 of amphibious vehicle 550.

Figure 18:
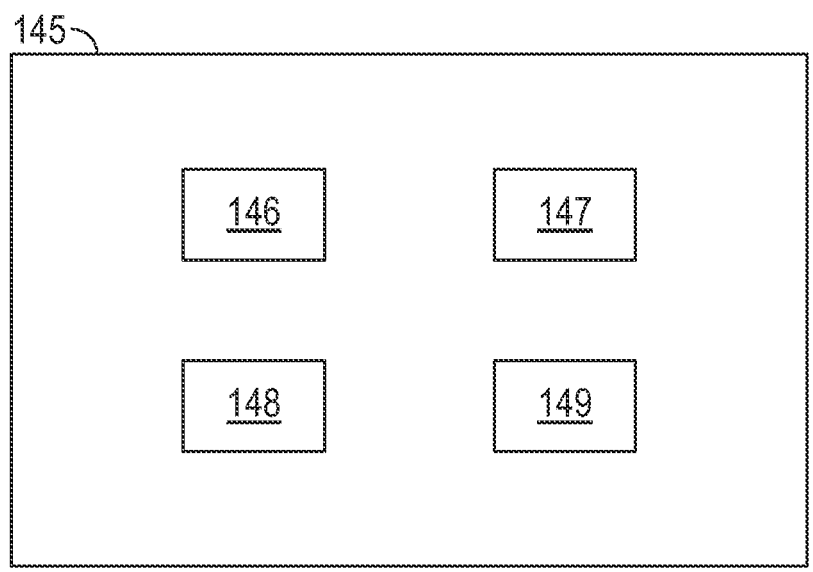
FIG. 18 is a schematic view of a control system of the amphibious vehicle of FIG. 1.

Referring now to FIG. 18, in some embodiments, control system 145 comprises an onboard autopilot including an inertial measurement unit (IMU) 146, a microcontroller 147, a bidirectional motor controller 148, a wireless or radio receiver 149. IMU 146, microcontroller 147, motor controller 148, and/or radio receiver 149 may be embodied on one or more printed circuit boards (PCBs). IMU 146 comprises one or more sensors such as triaxial gyroscopes and accelerometers and is configured to determine a current attitude of amphibious vehicle 100. Microcontroller 147 comprising a closed-loop proportional-integral-derivative (PID) feedback controller and configured to transmit control commands to the motor controller 148 based on data provided by the IMU 146. Motor controller 148 is configured to convert the control commands provided by microcontroller 147 into motor speed (e.g., a rotational speed of the drive motor 200 of one or more of the cycloidal propellers 160). Radio receiver 149 is configured to receive commands from a pilot of amphibious vehicle 100 and to transmit vehicle information (e.g., attitude, position, bearing, etc.) to the operator. The configuration of control system 145 may vary from that shown in FIG. 18 in other embodiments.

In some embodiments, when in the water operational mode, amphibious vehicle 100 may be translated forward by directing the thrust vector of each cycloidal propeller 160 in a forward direction (e.g., parallel with central axis 105) by rotating each of the cycloidal propellers 160 in the same rotational direction. Forward speed may be modulated by collectively varying the rotational speed of cycloidal propellers 160. The amphibious vehicle 100 may travel in reverse by altering the pitch phasing of each cycloidal propeller 160 (via the blade pitching systems 270 of propellers 160) such that the direction of the thrust vector produced by each cycloidal propeller 160 is reversed (projecting towards the rear 107 of amphibious vehicle 100). A yawing motion (e.g., rotation of amphibious vehicle 100 about the Z-axis in FIG. 1) in amphibious vehicle 100 may be produced by rotating the cycloidal propellers 160 along a first side 109 of amphibious vehicle 100 at a different rotational speed than the cycloidal propellers 160 located along the second, opposing lateral side 111 of amphibious vehicle 100.

A rolling motion (e.g., rotation of amphibious vehicle 100 about the X-axis) may be produced by varying the pitch phase angle between the cycloidal propellers 160 located along the first side 109 of amphibious vehicle 100 and the cycloidal propellers 160 located along the second side 111 of amphibious vehicle 100. For instance, the phase angle of the cycloidal propellers 160 located along the first side 109 may be altered to direct the thrust vectors produced by the propellers 160 along first side 109 downwards while the phase angle of the cycloidal propellers 160 located along the second side 111 may be altered to direct the thrust vectors produced by the propellers 160 along second side 111 upwards. A pitching motion (e.g., rotation of amphibious vehicle 100 about the Y-axis shown in FIG. 1) by varying the pitch phase angle between the cycloidal propellers 160 located along the front 103 of amphibious vehicle 100 and the cycloidal propellers 160 located along the rear 107 of amphibious vehicle 100. For instance, the phase angle of the cycloidal propellers 160 located along the front 103 may be altered to direct the thrust vectors produced by the propellers 160 along front 103 downwards while the phase angle of the cycloidal propellers 160 located along the rear 107 may be altered to direct the thrust vectors produced by the propellers 160 along rear 107 upwards.

Amphibious vehicle 100 may also translate vertically by altering the phase angle of the thrust vector produced by each cycloidal propeller 160 such that each thrust vector projects upwardly (to travel vertically upwards when submerged) or downwardly (to travel vertically downwards). When translating vertically using thrust vectoring the amphibious vehicle 100 may be rolled using differential rotational speed between the cycloidal propellers 160 located along the opposing sides 109, 111 thereof. The amphibious vehicle 100 may also be pitched when translating vertically using differential rotational speed between the cycloidal propellers 160 located at the front 103 and rear 107 thereof.

Table 1 below presents an exemplary control strategy for the land and water operational modes of amphibious vehicle 100. In Table 1 "WM" represents the water operational mode, "LM" represents the land operational mode, "CW" represents clockwise rotation, and "CCW" represents counterclockwise rotation. Additionally, 90 degree phasing as referenced in Table 1 is oriented along the X-axis shown in FIG. 1 while 180 degree phasing is oriented along the Z-axis shown in FIG. 1. Further, "Motor 1" and "Servo 1" may refer to the drive motor 200 and the servo motor 272 of the cycloidal propeller 160 located at the front 103 and second lateral side 111 of amphibious vehicle 100; "Motor 2" and "Servo 2" may refer to the drive motor 200 and the servo motor 272 of the cycloidal propeller 160 located at the rear 107 and second lateral side 111 of amphibious vehicle 100; "Motor 3" and "Servo 3" may refer to the drive motor 200 and the servo motor 272 of the cycloidal propeller 160 located at the front 103 and first lateral side 109 of amphibious vehicle 100; and "Motor 4" and "Servo 4" may refer to the drive motor 200 and the servo motor 272 of the cycloidal propeller 160 located at the rear 107 and first lateral side 109 of amphibious vehicle 100. It may be understood that the control strategy of amphibious vehicle 100 may vary in other embodiments from that shown in Table 1.

TABLE 1

|  | Motor 1: | Motor 2: | Motor 3: | Motor 4: | Servo 1: | Servo 2: | Servo 3: | Servo 4: |
|---|---|---|---|---|---|---|---|---|
| WM, Forward Motion | CW (Medium RPM) | CCW (Medium RPM) | CW (Medium RPM) | CCW (Medium RPM) | 90 degrees | 90 degrees | 90 degrees | 90 degrees |
| WM, Forward Roll | CW (Medium RPM) | CCW (Medium RPM) | CW (Medium RPM) | CCW (Medium RPM) | (91-179) degrees | (91-179) degrees | (1-89) degrees | (1-89) degrees |
| WM, Forward Pitch | CW (Medium RPM) | CCW (Medium RPM) | CW (Medium RPM) | CCW (Medium RPM) | (1-89) degrees | (91-179) degrees | (1-89) degrees | (91-179) degrees |
| WM, Forward Yaw | CW (Low RPM) | CCW (Low RPM) | CW (High RPM) | CCW (High RPM) | 90 degrees | 90 degrees | 90 degrees | 90 degrees |
| WM, Reverse Motion | CW (Medium RPM) | CCW (Medium RPM) | CW (Medium RPM) | CCW (Medium RPM) | 270 degrees | 270 degrees | 270 degrees | 270 degrees |
| WM, Vertical Motion | CW (Medium RPM) | CCW (Medium RPM) | CW (Medium RPM) | CCW (Medium RPM) | 0 degrees | 0 degrees | 0 degrees | 0 degrees |
| WM, Vertical Roll | CW (Low RPM) | CCW (Low RPM) | CW (High RPM) | CCW (High RPM) | 0 degrees | 0 degrees | 0 degrees | 0 degrees |
| WM, Vertical Pitch | CW (High RPM) | CCW (Low RPM) | CW (High RPM) | CCW (Low RPM) | 0 degrees | 0 degrees | 0 degrees | 0 degrees |
| WM, Vertical Yaw | CW (Medium RPM) | CCW (Medium RPM) | CW (Medium RPM) | CCW (Medium RPM) | (271-359) degrees | (271-359) degrees | (1-89) degrees | (1-89) degrees |
| WM, Vertical Reverse | CW (Medium RPM) | CCW (Medium RPM) | CW (Medium RPM) | CCW (Medium RPM) | 180 degrees | 180 degrees | 180 degrees | 180 degrees |
| LM, Forward | CW (Low RPM) | CW (Low RPM) | CW (Low RPM) | CW (Low RPM) | N/A | N/A | N/A | N/A |
| LM, Reverse | CCW (Low RPM) | CCW (Low RPM) | CCW (Low RPM) | CCW (Low RPM) | N/A | N/A | N/A | N/A |

While embodiments of the disclosure have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. An amphibious vehicle for traversing land and bodies of water, comprising:
    a chassis; and
    a cycloidal propeller coupled to the chassis, wherein the cycloidal propeller comprises:
        a plurality of cycloidal propeller blades rotatably coupled to the chassis and each extending parallel a rotational axis of the cycloidal propeller; and
        an extension/retraction system comprising a hub rotatably coupled to the plurality of cycloidal propeller blades and a linear actuator coupled between the hub and the chassis and configured to extend the plurality of cycloidal propeller blades away from the chassis and to retract the plurality of cycloidal propeller blades towards the chassis.

2. The amphibious vehicle of claim 1, wherein:
    the hub houses a drive motor configured to rotate the plurality of cycloidal propeller blades about the rotational axis.

3. The amphibious vehicle of claim 1, wherein the cycloidal propeller comprises a wheel rotatably coupled to the chassis, a drive motor, and a clutch actuable to transmit rotational torque from the drive motor to the wheel when the amphibious vehicle is in a land operational mode and from the drive motor to the plurality of cycloidal propeller blades when the amphibious vehicle is in a water operational mode.

4. The amphibious vehicle of claim 3, wherein the extension/retraction system is configured to retract the plurality of cycloidal propeller blades into a cavity formed within the wheel when the amphibious vehicle is in the land operational mode and to project the plurality of cycloidal propeller blades from the cavity when the amphibious vehicle is in the water operational mode.

5. The amphibious vehicle of claim 3, wherein:
the clutch comprises a rotor configured to rotate in unison with the plurality of cycloidal propeller blades about the rotational axis, and wherein the rotor comprises a first clutch plate;
the clutch comprises a rim coupled to the wheel and comprising a second clutch plate; and
the extension/retraction system is configured to displace the first clutch plate relative to the second clutch plate such that the first clutch plate enters into interlocking engagement with the second clutch plate.

6. The amphibious vehicle of claim 1, wherein the plurality of cycloidal propeller blades each comprises a blade shaft and the cycloidal propeller comprises a plurality of blade mounts coupled to the chassis and a blade pitching system comprising a plurality of blade pitching servos coupled between the plurality of blade mounts and the plurality of cycloidal propeller blades whereby the plurality of blade pitching servos are configured to rotate each of the cycloidal propeller blades about a longitudinal axis of the cycloidal propeller blade to alter a radial direction of a thrust vector produced by the cycloidal propeller and extending orthogonally from the rotational axis.

7. The amphibious vehicle of claim 1, wherein:
the cycloidal propeller comprises a plurality of blade pitching servos coupled to the plurality of cycloidal propeller blades, and wherein each of the plurality of blade pitching servos is configured to rotate one of the cycloidal propeller blades about a longitudinal axis of the cycloidal propeller blade; and
wherein the amphibious vehicle comprises a control system configured to individually control the actuation of the plurality of blade pitching servos.

8. An amphibious vehicle for traversing land and bodies of water, comprising:
a chassis; and
a cycloidal propeller coupled to the chassis, wherein the cycloidal propeller comprises:
a wheel rotatably coupled to the chassis;
a plurality of cycloidal propeller blades rotatably coupled to the chassis and each extending parallel a rotational axis of the cycloidal propeller;
a rotor configured to rotate in unison with the plurality of cycloidal propeller blades about the rotational axis, and wherein the rotor comprises a first clutch plate;
a rim coupled to the wheel and comprising a second clutch plate, wherein the first clutch plate is displaceable between a first position spaced from the second clutch plate and a second position in interlocking engagement with the second clutch plate; and
a drive motor configured to transmit rotational torque to the wheel when the amphibious vehicle is in a land operational mode and to transmit rotational torque to the plurality of cycloidal propeller blades when the amphibious vehicle is in a water operational mode.

9. The amphibious vehicle of claim 8, further comprising, an extension/retraction system comprising a hub rotatably coupled to the plurality of cycloidal blades and a linear actuator coupled between the hub and the chassis and configured to displace the first clutch plate relative to the second clutch plate such that the first clutch plate enters into the interlocking engagement with the second clutch plate.

10. The amphibious vehicle of claim 8, wherein the amphibious vehicle comprises a water propulsion system comprising at least one of a pump-jet and a propeller, the water propulsion system configured to provide a thrust to the amphibious vehicle when the amphibious vehicle is in the water operational mode.

11. The amphibious vehicle of claim 8, wherein the plurality of cycloidal propeller blades each comprises a blade shaft and the cycloidal propeller comprises a plurality of blade mounts coupled to the chassis and a blade pitching system comprising a plurality of blade pitching servos coupled between the plurality of blade mounts and the plurality of cycloidal propeller blades whereby the plurality of blade pitching servos are configured to rotate each of the cycloidal propeller blades about a longitudinal axis of the cycloidal propeller blade to alter a radial direction of a thrust vector produced by the cycloidal propeller and extending orthogonally from the rotational axis.

12. The amphibious vehicle of claim 8, wherein:
the cycloidal propeller comprises a plurality of blade pitching servos coupled to the plurality of cycloidal propeller blades, and wherein each of the plurality of blade pitching servos is configured to rotate one of the cycloidal propeller blades about a longitudinal axis of the cycloidal propeller blade; and
wherein the amphibious vehicle comprises a control system configured to individually control the actuation of the plurality of pitching actuators.

13. An amphibious vehicle, comprising:
a chassis; a plurality of cycloidal propellers coupled to the chassis, wherein each of the cycloidal propellers comprises: a plurality of blade mounts coupled to the chassis; a plurality of cycloidal propeller blades each comprising a blade shaft rotatably coupled to the plurality of blade mounts and each extending parallel a rotational axis of the cycloidal propeller; a blade pitching system comprising a plurality of blade pitching servos coupled between the plurality of blade mounts and the plurality of cycloidal propeller blades whereby the plurality of blade pitching servos are configured to rotate each of the cycloidal propeller blades about the blade shaft of the cycloidal propeller blade to alter a radial direction of a thrust vector produced by the cycloidal propeller and extending orthogonally from the rotational axis; wherein the chassis comprises one or more control surfaces positioned on an exterior of the chassis to stabilize the vehicle during operation.

14. The amphibious vehicle of claim 13, wherein the cycloidal propeller comprises an extension/retraction system comprising a hub rotatably coupled to the plurality of cycloidal propeller blades and a linear actuator coupled between the hub and the chassis and configured to extend the plurality of cycloidal propeller blades away from the chassis and to retract the plurality of cycloidal propeller blades towards the chassis.

15. The amphibious vehicle of claim 14, wherein the cycloidal propeller comprises a wheel rotatably coupled to the chassis and a drive motor configured to transmit rotational torque to the wheel when the amphibious vehicle is in a land operational mode and to transmit rotational torque to the plurality of cycloidal propeller blades when the amphibious vehicle is in a water operational mode.

16. The amphibious vehicle of claim 15, wherein the extension/retraction system is configured to retract the plurality of cycloidal propeller blades into a cavity formed within the wheel when the amphibious vehicle is in the land operational mode and to project the plurality of cycloidal propeller blades from the cavity when the amphibious vehicle is in the water operational mode.

* * * * *